(12) United States Patent
Kunkel et al.

(10) Patent No.: US 10,395,421 B2
(45) Date of Patent: Aug. 27, 2019

(54) SURROUND AMBIENT LIGHT SENSING, PROCESSING AND ADJUSTMENT

(71) Applicant: Dolby Laboratories Licensing Corporation, San Francisco, CA (US)

(72) Inventors: Timo Kunkel, Kensington, CA (US); Patrick Griffis, Sunnyvale, CA (US); Gregory John Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 26 days.

(21) Appl. No.: 15/746,180

(22) PCT Filed: Jul. 21, 2016

(86) PCT No.: PCT/US2016/043422
§ 371 (c)(1),
(2) Date: Jan. 19, 2018

(87) PCT Pub. No.: WO2017/015507
PCT Pub. Date: Jan. 26, 2017

(65) Prior Publication Data
US 2018/0211440 A1    Jul. 26, 2018

Related U.S. Application Data

(60) Provisional application No. 62/195,107, filed on Jul. 21, 2015.

(51) Int. Cl.
*G06T 15/50* (2011.01)
*G06T 15/04* (2011.01)
(Continued)

(52) U.S. Cl.
CPC .......... *G06T 15/506* (2013.01); *G06F 3/147* (2013.01); *G06T 15/04* (2013.01); *G06T 19/006* (2013.01);
(Continued)

(58) Field of Classification Search
CPC combination set(s) only.
See application file for complete search history.

(56) References Cited

U.S. PATENT DOCUMENTS 8,319,723 B2   11/2012   Noergaard
8,878,786 B2   11/2014   Imai
(Continued)

FOREIGN PATENT DOCUMENTS

EP    2293273    3/2011
EP    2851894    3/2015

OTHER PUBLICATIONS

Meilland, M. et al "3D High Dynamic Range Dense Visual SLAM and Its Application to Real-Time Object Re-lighting" IEEE International Symposium on Mixed and Augmented Reality, Oct. 1, 2013, pp. 143-152.
(Continued)

*Primary Examiner* — Wesner Sajous

(57) ABSTRACT

Directional image sensor data may be acquired with one or more directional image sensors. A light source and illumination image may be generated based on the directional image sensor data. A number of operations may be caused to be performed for an image based at least in part on light source information in the light source image. The operations may include display management operations, device positional operations, augmented reality superimposition operations, ambient light control operations, etc.

20 Claims, 11 Drawing Sheets

(51) Int. Cl.
*G06T 19/00* (2011.01)
*G06F 3/14* (2006.01)
*G09G 3/00* (2006.01)
*H04N 7/15* (2006.01)
*H04N 5/58* (2006.01)
*G06F 3/147* (2006.01)

(52) U.S. Cl.
CPC ............... *G09G 3/00* (2013.01); *H04N 5/58* (2013.01); *G06T 2215/16* (2013.01); *G09G 2320/028* (2013.01); *G09G 2320/0261* (2013.01); *G09G 2340/12* (2013.01); *G09G 2360/144* (2013.01); *H04N 7/15* (2013.01); *H04N 7/157* (2013.01)

(56) References Cited

U.S. PATENT DOCUMENTS

| | | | |
|---|---|---|---|
| 2009/0313584 A1 | 12/2009 | Kerr | |
| 2010/0103172 A1 | 4/2010 | Purdy, Sr. | |
| 2012/0182276 A1* | 7/2012 | Kee | G09G 5/10 345/207 |
| 2012/0327683 A1* | 12/2012 | Yee | G02B 26/004 362/602 |
| 2013/0009982 A1 | 1/2013 | Fontijne | |
| 2013/0088469 A1* | 4/2013 | Yee | G02B 26/023 345/207 |
| 2013/0141434 A1 | 6/2013 | Sugden | |
| 2013/0147777 A1* | 6/2013 | Lau | G02B 26/00 345/207 |
| 2013/0194254 A1 | 8/2013 | Miyoshi | |
| 2014/0210802 A1* | 7/2014 | Myers | G09G 3/3413 345/207 |
| 2014/0232614 A1 | 8/2014 | Kunkel | |
| 2016/0245916 A1* | 8/2016 | Weber-Grabau | A01M 1/026 |

OTHER PUBLICATIONS

Wan, G. et al "Applications of Multi-Bucket Sensors to Computational Photography" Stanford Computer Graphics Laboratory Technical Report, Jan. 2012, pp. 1-10.
Anonymous "Using Image Fusion to Capture High Dynamic Range (HDR) Scenes", Jun. 10, 2009, pp. 1-9.
Debevec, Paul "A Median Cut Algorithm for Light Probe Sampling" Technical Report 67, USC Institute for Creative Technologies, 2005.
Nayar, S.K. et al "High Dynamic Range Imaging: Spatially Varying Pixel Exposures" IEEE Conference on Computer Vision and Pattern Recognition, vol. 1, Jun. 2000, pp. 472-479.
https://www.ptgrey.com/360-degree-spherical-camera-systems.
https://theta360.com/en/about/theta/technology.html.

* cited by examiner

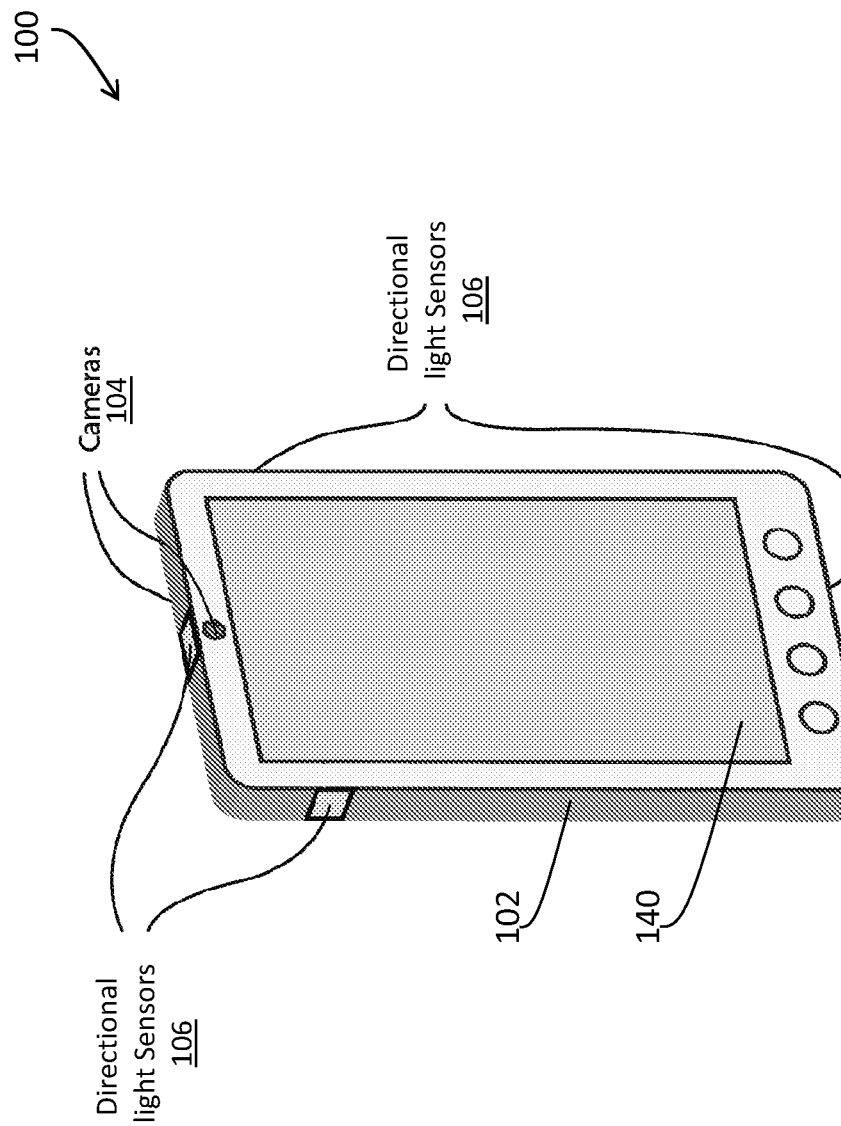

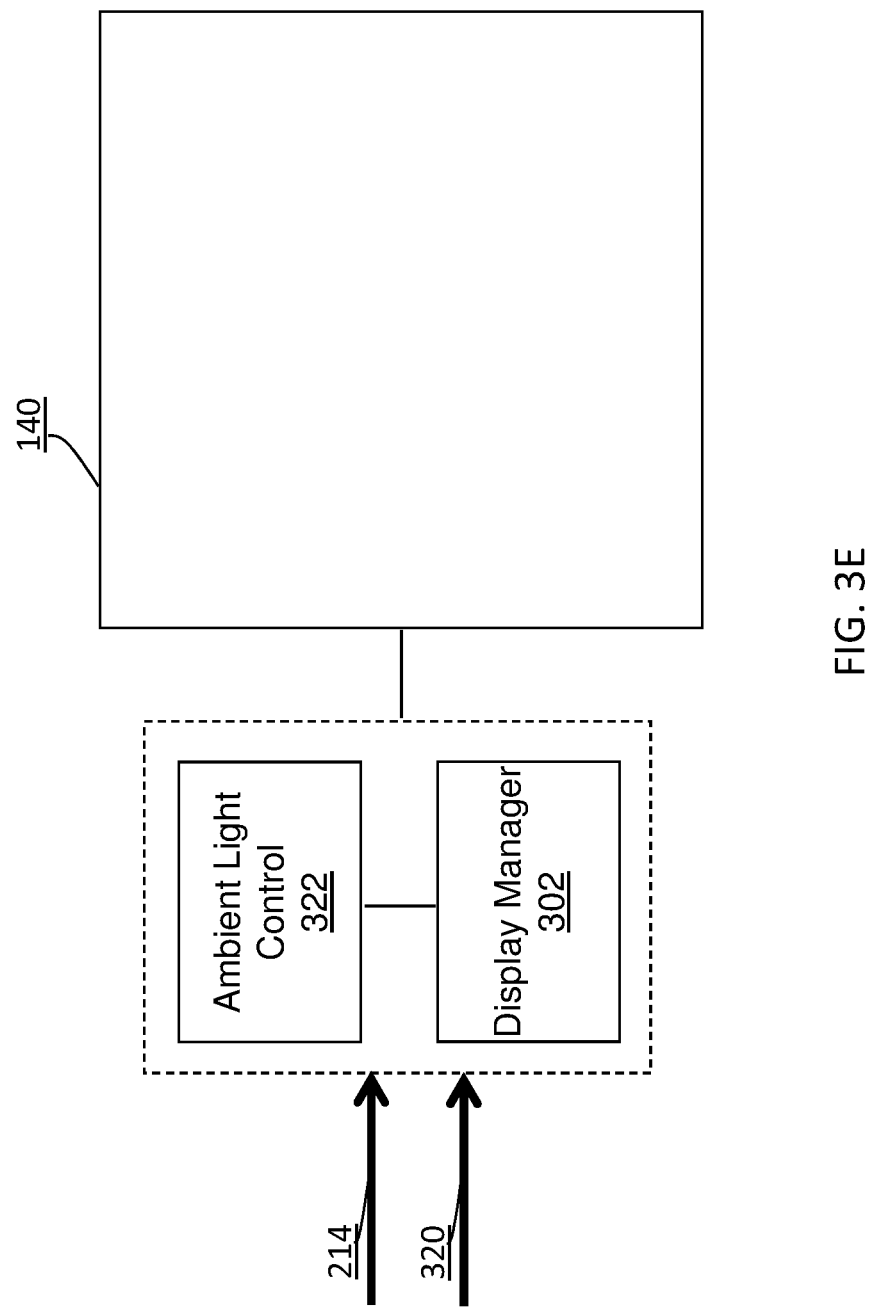

SURROUND AMBIENT LIGHT SENSING, PROCESSING AND ADJUSTMENT

CROSS-REFERENCE TO RELATED APPLICATIONS

The present invention claims the benefit of U.S. Provisional Patent Application No. 62/195,107, filed on 21 Jul. 2015, which is hereby incorporated by reference.

TECHNOLOGY

The present invention relates generally to vision devices, and in particular, to surround ambient light sensing, processing and adjustment for vision devices.

BACKGROUND

Video materials may be created and color graded with specific artistic intent in professional production settings. These professional production settings may be very different from viewing environments in which the video materials are to be rendered. As a result, instead of seeing vivid, highly detailed images with intended color properties, viewers may see dull, washed out, poorly colored images that significantly deviate from the artistic intent with which the video materials were initially created and color graded in the professional production settings.

Vision devices such as consumer televisions, mobile devices, etc., may attempt to adjust picture mapping to compensate for ambient light based on measurements of global ambient light levels. However, such adjustment and compensation (e.g., non-directional, brightness only, etc.) may be too simplistic to generate full precise real time picture mapping for effectively alleviating ambient light problems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1A illustrates an example light map based controller comprising a light source identification module operating in conjunction with directional image sensors;

FIG. 3E illustrates an example configuration in which an ambient light control unit uses light map based control output to perform ambient light control operations;

DESCRIPTION OF EXAMPLE EMBODIMENTS

Figure 1B:
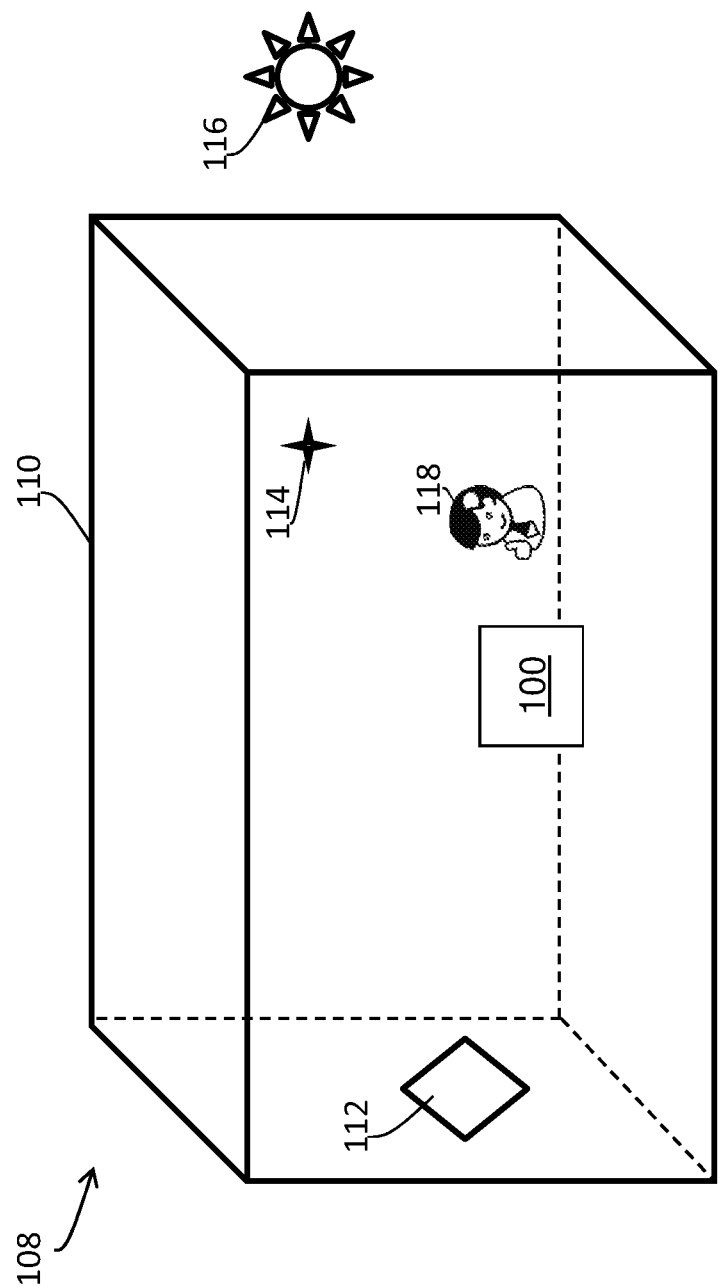
FIG. 1B illustrates an example operational environment in which the light map based controller may operate.

Example embodiments, which relate to surround ambient light sensing, processing and adjustment for vision devices, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. ACQUIRING LIGHT SOURCE INFORMATION
3. EXAMPLE LIGHT MAP BASED CONTROLLER
4. DISPLAY MANAGEMENT
5. DEVICE LOCATION MANAGEMENT
6. PERSPECTIVE RENDERING
7. AUGMENTED REALITY
8. AMBIENT LIGHT CONTROL
9. EXAMPLE PROCESS FLOWS
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Under techniques as described herein, relatively accurate light source and illumination information may be acquired from sensor data generated by one or more (e.g., a single, a multitude of, etc.) directional image sensors in one or more of a variety of geographic locations such as a scene where original source images are captured, a mobile device or a (home) TV which forms a temporally closed loop ambient capture and display management setup, a location of a video conference, a color grading environment, an image rendering environment, an automobile, a tunnel, etc.

The acquired light source and ambient light information may be used to perform display management operations, device location operations, augmented reality superimposition operations, ambient light control operations, etc., for any of a wide range of devices. These devices may include relatively small footprint devices (e.g., mobile devices, video game devices, camera phones, etc.), relatively large footprint devices (e.g., home-based systems, desktop computer displays, movie cameras, etc.), display devices (e.g., dashboard displays, rear-seat displays, etc.) in automobiles, display devices operating in conjunction with video conferencing systems, display devices used by colorists in color grading environments, movie cameras, etc.

Display management operations refer to operations that exploit (e.g., full, etc.) display capabilities of a target device (e.g., an image rendering device, etc.) for the purpose of rendering (e.g. visual adjustment, tone and gamut mapping, appearance mapping) images with high details, high dynamic range and vivid colors. Under techniques as described herein, these operations may be performed based in part on light source information acquired in real time or in near real time at an image rendering environment in which images are being rendered. Facial detection or face tracking along with the light source information may be used to enable the target device to determine spatial relationships between a viewer and any light sources present in the image rendering environment. A directional light map may be built for a reference image rendering surface of the target device on which images are to be rendered. Ambient light properties of the reference image rendering surface as perceived by the viewer may be deduced/estimated/predicted based at least in part on the directional light map and optical properties of a display screen to which the reference image rendering surface correspond. Based on the ambient light properties, different black levels, different contrast settings, different white points, different primary colors, etc., may be configured for different spatial portions of the reference image rendering surface. For example, for a first spatial portion (of the reference image rendering surface) with a relatively low ambient light level, a normal black level, a normal contrast setting, etc., may be configured. Here, the first spatial portion refers to a specific area on the reference image rendering surface. In contrast, for a second spatial portion (of the reference image rendering surface) with a relatively high ambient light level, an elevated black level, an elevated contrast setting, etc., may be configured. Here, the second spatial portion refers to another specific area on the reference image rendering surface other than the first spatial portion. As a result, images can be rendered with high perceptual fidelity and high immersive-ness for a salient part or the entirety of the image rendering surface in a variety of image rendering environments.

Device location operations refer to operations that cause a target device (e.g., an image rendering device, etc.) to be repositioned into a better position and/or a better orientation for the purpose of rendering images with high details, high dynamic range and vivid colors. Under techniques as described herein, these operations may be performed based in part on light source information acquired in real time or in near real time at an image rendering environment in which images are being rendered. With the light source information, directional light maps for a variety of spatial volumes, spatial surfaces, etc., can be deduced in reference to a viewer whose head (or face) is tracked for example by face detection techniques, head tracking techniques, etc. For example, the target device may generate a directional light map for a display screen (or a reference image rendering surface) of the target device at the current position and/or current orientation, as well as one or more directional light maps for other reference surfaces (or candidate image rendering surfaces) to which the display screen of the target device may be relocated. In response to determining there is an optimal reference surface for image rendering based on the generated directional light maps, if automatically controllable moving mechanisms are available, the target device may be automatically repositioned (or relocated) into the optimal reference surface. Additionally, optionally, or alternatively, a viewer/user of the target device may be alerted (e.g., haptically, visually, audibly, etc.) to the existence of one or more better (e.g., optimal, etc.) reference surfaces to which the target device should be repositioned. In response, the viewer/user may effectuate the repositioning (or relocation) of the target device to the suggested reference surface or another better surface other than one at the current position and/or current orientation.

When a display screen is tilted from a view angle (or a line of sight) of a viewer/user for example to avoid strong light reflections on the display screen, an image may be displayed in perspective with the viewing angle of the viewer/user. The rendered portion of the image may be perceptually the same as or equivalent to a rendered portion of the same image as if rendered on a non-tilted image rendering surface (as if the user would have a frontal view of the non-tilted image rendering surface). In some embodiments, this type of perceptive rendering of an image on a tilted image rendering surface may be beneficially used when the target device has a high resolution screen (e.g., hiDPI or 'Retina' type, etc.).

Augmented reality operations refer to operations that superimpose an object or person that does not actually exist in images captured from a scene onto the images. Under techniques as described herein, these operations may be performed based in part on light source information acquired at an image capturing environment (e.g., a scene, etc.) in which the images are taken. The light source information may be used to enable the superimposition of the object or person in a realistic manner. In an example, in the case of a video conferencing system, light source information of a location in a video conference may be captured and used to superimpose an image portion representing a participant not at the location with images captured at the location. The superimposition of the participant with the images may be performed realistically (e.g. matching color appearance such as white point and light distribution in the scene) based on the light source information of the location; as a result, the participant not at the location may appear in the images as if the participant were one of the participants actually present at the location. The superimposed images may be provided to all locations of the video conference as if all the participants were meeting in the same location. In another example, one or more participants of a video game at one or more different locations may be superimposed in a video game scene through augmented reality operations as described herein.

In some operational scenarios, some or all of ambient light conditions such as light sources, blinds, transmissive and/or reflective properties of display screen, wall, optical polarizers, etc., present in a viewing environment, in an image rendering environment, etc., may be controllable, automatically without user input and/or manually via user interactions. Light source information acquired under techniques as described herein can be used to control light source properties, light source operational states, blinds, transmissive and/or reflective properties of display screen, wall, optical polarizers, etc., to cause the ambient light conditions of the viewing environment, the image rendering environment, etc., to become optimal for high quality image rendering.

Additionally, optionally, or alternatively, the ambient light conditions of the image rendering environment may be controlled to simulate ambient light conditions of an original color grading environment in which the images were color graded. For example, feedbacks may be provided by a system implementing techniques as described herein to aid in the adjustment of ambient light condition in the image rendering environment (e.g., living room, etc.) to create an optimal viewing experience consistent with the original color grading environment for effectively and optimally preserving the creative intent. Conversely, feedbacks may be provided by a system implementing techniques as described herein to aid in the adjustment of ambient light condition in a color grading environment to simulate the image rendering environment (e.g., living room, etc.) to allow a colorist to obtain an idea how that image rendering environment will impact on viewing images being graded by the colorist.

Light source information as described herein can be used not only to predict/estimate ambient light conditions incident on a reference surface, but also to determine what a viewer/user would see. For example, optimal properties (e.g., reflectivity, scattering, glossiness, diffusive properties, etc.) of a display screen may be used together with the ambient light conditions incident on the reference surface to determine what ambient light conditions would be perceived by the viewer/user. Additionally, optionally, or alternatively, the light source information may be used in some image rendering environments associated with a moving target device in a vehicle, with a pedestrian, etc., to determine ambient light or directional light that are not reflected off from a display screen. For example, the light source condition may be used to determine incoming headlights or glares. A movable/tiltable display screen such as a dashboard display, etc., may be (e.g., automatically, etc.) moved/tilted to a better position and/or a better orientation to allow a viewer/user to look to a different viewing angle that would not look into strong light or glares.

In some example embodiments, mechanisms as described herein form a part of a media processing system, including but not limited to any of: mobile device, video game devices, display device, media player, media server, media production system, camera systems, home-based systems, communication devices, video processing system, video codec system, studio system, streaming server, cloud-based content service system, a handheld device, game machine, television, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Acquiring Light Source Information

FIG. 1A illustrates an example light map based controller 100 comprising a light source identification module 102 operating in conjunction with one or more directional image sensors such as one or more cameras 104, one or more non-camera directional image sensors 106, etc.

In some embodiments, some or all of the cameras (104) and the non-camera directional image sensors (106) is a part of a computing device containing the light source identification module (102). In some embodiments, some or all of the cameras (104) and the non-camera directional image sensors (106) is a part of an accessory to a computing device containing the light source identification module (102). In some embodiments, some or all of the cameras (104) and the non-camera directional image sensors (106) is external to a computing device containing the light source identification module (102). A directional image sensor as described herein may be directly or indirectly linked to the light source identification module (102) via one or more data links (e.g., wireless, wired, electric contact based, inductively coupled, Bluetooth, USB based, etc.).

A light source identification module as described herein may be implemented in, but not limited to only, any of: a mobile phone; a video game device, a television; a tablet computer; a heads up display (HUD) device; a dashboard display device; a display device operating in conjunction with one or more computers; a display device in an automobile, boat, ship, aircraft, etc.; a home theater system; a color grading system; etc.

A directional image sensor (e.g., one of 104, 106, etc.) may be configured for wide angle capturing/sensing of directional light. A directional image sensor (e.g., one of 104, 106, etc.) may be configured for medium or narrow angle capturing/sensing of directional light. A directional image sensor (e.g., one of 104, 106, etc.) may be configured for generating directional image sensor data of relatively high spatial resolutions. A directional image sensor (e.g., one of 104, 106, etc.) may be configured for generating directional image sensor data of relatively low spatial resolutions.

In some embodiments, a directional image sensor as described herein is provisioned, disposed, secured, etc., on (e.g., edges of, etc.) a case of a computing device such as a (e.g., protective, etc.) case of a mobile phone, an accessory to a video game device, a case of a tablet computer, a housing or affixture of a device (e.g., television, set-top box, etc.), etc.

In some embodiments, the same type of directional image sensors can be used in the light source identification module (102). In some embodiments, two or more different types of directional image sensors can be used in the light source identification module (102). For example, in an embodiment as shown in FIG. 1A, the front and back facing cameras (104) may be directional image sensors of a first type, whereas four directional image sensors (106) at edges of the light source identification module (102) may be directional image sensors of a second different type.

In some embodiments, the cameras (104), individually or collectively, comprise software, hardware, a combination of software and hardware, etc., such as an electro-optical configuration including but not limited to an image acquisition controller, an aperture, one or more lenses, zero or more filters, one or more image sensors, programmatic and/or manual mechanisms to control settings (e.g., focal length, aperture size, exposure time, etc.) and operations of one or both of the cameras (104) for directional light sensing purposes. In some embodiments, as illustrated in FIG. 1A, the cameras (104) may represent front and back facing cameras that are a part of the light source identification module (102), for example in a mobile phone (e.g., an iOS device such as iPhone, an Android device, a Windows phone, etc.). Examples of the cameras (104) may include, but are not limited to only, any of: digital cameras, non-digital cameras, analog camera, camera equipped with photosensitive chemicals, webcams, etc.

Additionally, optionally, or alternatively, a directional image sensor as described herein may be, but is not limited to only, any of: CMOS-based directional image sensors, CCD-based directional image sensors, nanotube-based directional image sensors (e.g., a combination of nanotubes that are oriented to different spatial directions, etc.), LED-based image sensors, solar cell arrays, quantum dot photoconductors, photodiodes, polymer-based image sensors (e.g., used on a case, etc.), any combination of the foregoing, etc. Some or all of the directional image sensors may be calibrated to generate relatively reliable luminance and colorimetric information.

A light map based controller (e.g., 100 of FIG. 1A) as described herein may be deployed to operate in diverse environments such as homes, offices, vehicles, highways, tunnels, roads, public places, movie studios, color grading environments, color grading studios, ambient light controlled environments, ambient light uncontrolled environment, etc.

FIG. 1B illustrates an example operational environment 108 in which the light map based controller (100) may operate. The operational environment (108) comprises a physical structure 110 (e.g., a room, an office, a building, etc.) in which a user 118 may make use of a computer device such as a mobile phone, a video game device, etc., that operates in conjunction with the light map based controller (100).

Zero, one or more light sources may be present in any given operational environment such as 108 of FIG. 1B. A light source (e.g., emissive, reflective, transmissive, etc.) as described herein may also be emitting or reflecting off light in different light intensities, different colors, etc. Additionally, optionally, or alternatively, a light source as described herein may be any geometric shapes including but not limited to only any of: point light sources, area light sources (or non-point light sources), textured light sources, array-based light sources, edge-based light sources, etc.

Light sources may be located in various directions, various distances, etc., from a reference image rendering surface (e.g., 140 of FIG. 1A, etc.). The reference image rendering surface may be a display screen of a target device such as a mobile phone; a video game device; a television; a tablet computer; a heads up display (HUD) device; an Augmented Reality (AR) Display; a dashboard display device; a display device operating in conjunction with one or more computers; a display device in an automobile, boat, ship, aircraft, etc.; a home theater system; a color grading system; etc. In a non-limiting example, the reference image rendering surface may be a part of a computing device containing the light source identification module (102).

In the operational environment (108) as illustrated in FIG. 1B, an area light source 112—which may be provided by an object or a wall of high light reflectivity or albedo—is present to the left of the light map based controller (100); a point light source 114—which may be provided by an active light emitter (e.g., a white or color LED, etc.)—is present at an upper left direction relative to the light map based controller (100); a portion of sunlight from the Sun (116) may also reach into the physical structure (110); etc.

In some embodiments, directional image sensors of the light map based controller (100) collectively represent an implementation of a camera subsystem able to capture light source images each of which may be generated based on a combination of multiple portions of directional image sensor data acquired by these directional image sensors. Examples of light source images include, but are not limited to only: any of: low spatial resolution light source images, medium spatial resolution light source images, high spatial resolution light source images, spherical images, non-spherical images, 3D images, etc.

Each portion of the multiple portions of directional image sensor that are used to generate a light source image may represent a portion of directional image sensor data captured by a directional image sensor of the directional image sensors for one or more solid angles relative to the directional image sensor or an optical axis of the directional image sensor. In a first non-limiting example, a portion of directional image sensor data may be generated by a directional image sensor from electric charges in diodes as excited/produced by light incident on the directional image sensor from one or more solid angles in one or more directions relative to the directional image sensor or an optical axis of the directional image sensor. In a second non-limiting example, a portion of directional image sensor data may be generated by a directional image sensor and comprises pixel data representing light incident on the directional image sensor from one or more solid angles of one or more directions relative to the directional image sensor or an optical axis of the directional image sensor.

Figure 1C:
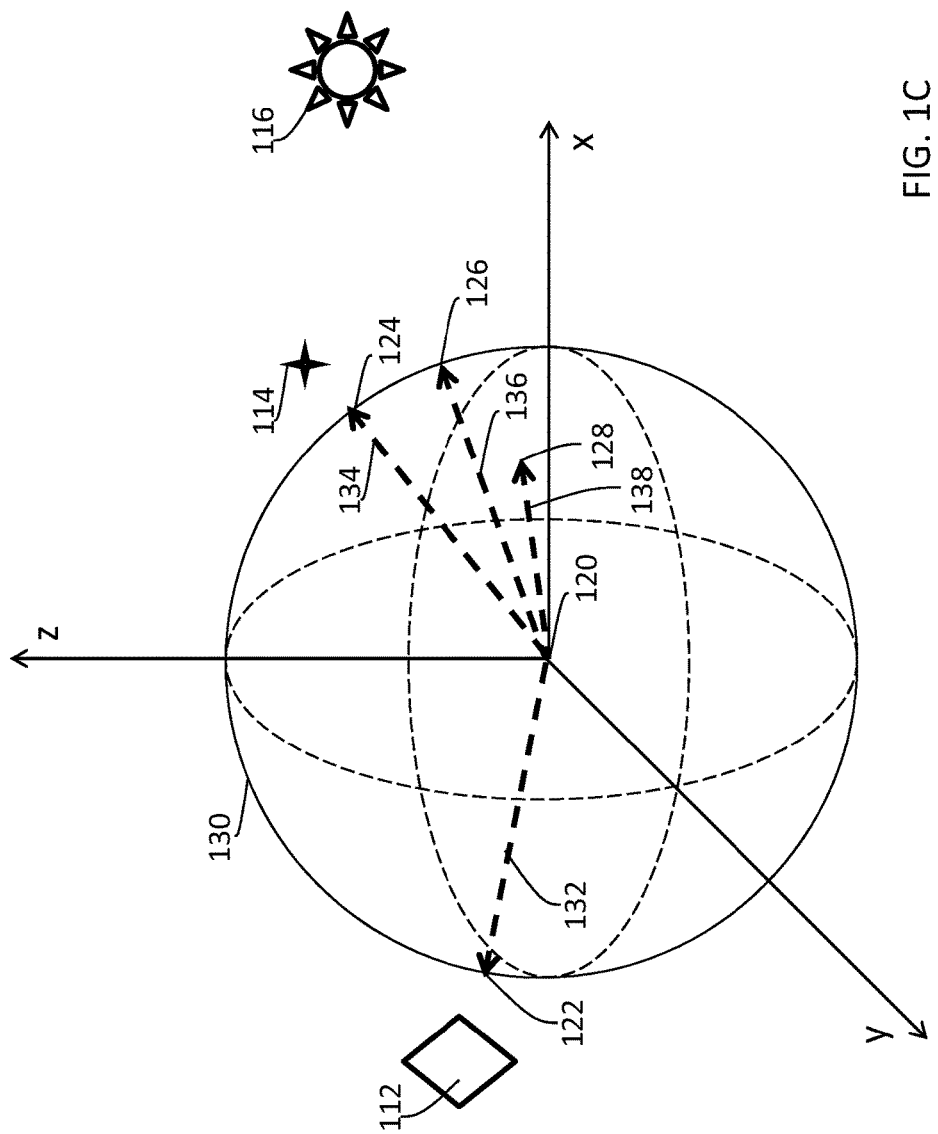
FIG. 1C illustrates an example light source image.

FIG. 1C illustrates an example light source image 130, which may be generated by the light map based controller (100) of FIG. 1A or FIG. 1B in the example operational environment (108) of FIG. 1B. In an example, a light source map image as described herein may be generated based on directional image sensor data acquired through one or two fisheye lens cameras (e.g., the front and back facing cameras (104), etc.) in the front and back of a mobile device containing the light source identification module (102). In another example, a light map image as described herein may be generated based on directional image sensor data acquired through directional image sensors that are in addition to or in place of one or two cameras. Some of the directional image sensors may be non-camera directional image sensors deployed at different edges of a physical housing or a physical case containing the light source identification module (102); thus, because of these non-camera directional image sensors, the viewing angles of any existing cameras need not be as wide as that of a fisheye lens. Additionally, optionally, or alternatively, in some embodiments, some or all of a light source image as described herein may be entirely generated based on directional image sensor data acquired through directional image sensors other than cameras; these non-camera directional image sensors can be deployed on one or more edges of the light source identification module (102) such as a mobile device, etc. In some embodiments, some of the directional image sensors may be provisioned redundantly to allow light blockage to some image sensors without adversely impacting the construction of a light source image as described herein in various operational scenarios.

In some embodiments, the light source image (130) may, but needs not to, be of a high spatial resolution. In some embodiments, as the light source image (130) is to capture directions and positions of light sources that can affect image rendering qualities on an image rendering surface such as the reference image rendering surface (140 of FIG. 1A), a few hundred to thousand pixels may be sufficient to represent these light sources and their directions. To reduce electricity consumption (or to save battery resources), image sensors may be binned or pixels, photo cells, etc. selectively read out so that the image sensors may be generating a data output from every $10^{th}$ pixel, every $100^{th}$ pixel, etc., when operating in a special mode for acquiring directional image sensor data, rather than generate a data output from every pixel when operating in a normal picture capturing mode. Additionally, optionally, or alternatively, spatial and/or or temporal interpolation may be performed based on acquired data at some pixels to fill in, predict or estimate (e.g., pixel-level) light source related information gaps at some other pixels, as pixel level information may not be available for the other pixels (for example) because of temporary or permanent blockage of one or more image sensors. As a result, continuous capturing of megapixel images that may drain battery very quickly may be avoided under techniques as described herein. Additionally, optionally, or alternatively, special purpose integrated circuits, coprocessors, analog-to-digital converters, lenses, shutters, etc., that exhibit relatively high energy efficiency may be used to implement at least some of the techniques as described herein.

As shown in FIG. 1C, the light source image (130) may be a spherical image comprising a first light source image portion 122, a second light source image portion 124, a third light source image portion 126, etc., which respectively represent the area light source (112), the point light source (114), the Sun (136), etc. By way of example but not limitation, The spherical light source image (130) may be represented in a three dimensional spatial coordinate system; by way of example but not limitation, the spatial coordinate system may be formed based on spatial coordinates x, y, and z, as illustrated in FIG. 1C, of an overall four dimensional space time coordinate system formed based on space and time coordinates x, y, z and t (representing the time coordinate; not shown). Additionally, optionally, alternatively, instead of using an X-Y-Z coordinate system, another coordinate system including but not limited to a spherical coordinate system based on longitude and latitude, a coordinate system based on azimuthal and elevation angles, etc., can be used for representing a light source image therein.

In some embodiments, the spatial coordinate system in which the light source image (130) is represented may be directly defined in relation to a spatial position, a spatial orientation, etc., of a reference surface such as the reference image rendering surface (140 of FIG. 1A) at a time when the time directional image sensor data for generating the light source image (130) is acquired by the directional image sensors of the light map based controller (100). In these embodiments, the spatial coordinate system may be called as a relative coordinate system, as the spatial coordinate system is defined relative to the spatial position, the spatial orientation, etc., of the reference surface.

In some embodiments, instead of or in addition to containing pixel data, a light source image may be represented by, or may be converted to, (e.g., geometric, optical, physical, etc.) constructs that are derived from the pixel data combined/assembled from directional image sensors. In some embodiments, some or all of a light source image as described herein may be represented by vectors, contours, point spread functions, primary colors, etc., related to light sources detected at least in part from sensor data from directional image sensors. For example, instead of containing pixel data, the light source image (130) may comprise a first vector 132 that represents the first light source (112), a second vector 134 that represents the second light source (114), a third vector 136 that represents the third light source (116), etc. In some embodiments, each of these vectors (e.g., 132, 134, 136, etc.) may be a specific unit vector on a unit sphere in relation to the reference point 120. Other constructs such as contours, point spread functions, primary colors, etc., may also be used in the light source image (130) to represent shapes, light distribution properties, colorimetric properties such as white points, etc., of the light sources (e.g., 112, 114, 116, etc.) in the light source image (130). In some embodiments, techniques such as those related to medium cut algorithm may be used to convert a light source image in a pixel data representation (e.g., pixels in a spherical image, etc.) to a new light source image in a non-pixel data representation that uses non-pixel data constructs. These techniques may be used to identify highlights and/or bright parts of a spherical image and generate a vector representation comprising a set of vector coordinates identifying positions of the highlights and/or bright parts. The set of vector coordinates may comprise combinations/coordinates of longitude and latitude. Some discussion of medium cut algorithms can be found in P. Debevec, "A Median Cut Algorithm for Light Probe Sampling," Technical Report 67, USC Institute for Creative Technologies (2005), the content of which is incorporated by reference herein.

In some embodiments, the spatial coordinate system in which the light source image (130) is represented may be directly or indirectly defined in relation to a relatively universal reference coordinate system such as a world coordinate defined in relation to the Earth's position and orientation, the solar system's spatial location, spatial orientation, etc., at a time when the time directional image sensor data for generating the light source image (130) is acquired by the directional image sensors of the light map based controller (100). In these embodiments, the spatial coordinate system may be called as an absolute coordinate system, as the spatial coordinate system is defined relative to the spatial position, the spatial orientation, etc., of the relatively universal reference coordinate system.

In some embodiments, while the spatial coordinate system in which the light source image (130) is represented may be directly defined in relation to a spatial position, a spatial orientation, etc., of a reference surface, a spatial relationship (e.g., represented by a transformation matrix, a set of algebraic relationships, etc.) may be established between the spatial coordinate system and a relatively universal coordinate system. The spatial relationship between the two coordinate systems may be used to map between a spatial location, a spatial displacement, a vector, etc., in one of the two coordinate systems to those in the other of the two coordinate systems. For example, a spatial position, a spatial orientation, etc., of the sun (or another object such as another light source, a face, a reference surface, a light reflection area on a reference surface, etc.) in a word coordinate system may be converted into a corresponding spatial position, a spatial orientation, etc., of the sun (or the other object such as the other light source, the face, the reference surface, the light reflection area, etc.) in the relative coordinate system defined relative to the reference surface. Conversely, a spatial position, a spatial orientation, etc., of the reference surface (or another object such as a light source, a face, a light reflection area on a reference surface, etc.) in the relative coordinate system may be converted (e.g., inversely, etc.) into a corresponding spatial position, a spatial orientation, etc., of the reference surface (or the other object such as the light source, the face, the light reflection area, etc.) in the universal coordinate system.

In some embodiments, the light map based controller (100) may operate in conjunction with one or more locational sensors such as one or more of (e.g., internal, etc.) motion sensors, position sensors, orientation sensors, gyroscopes, electronic compasses, accelerometers, global positioning system (GPS) modules, etc. In some embodiments, some or all of these locational sensors may be built-in components of the light map based controller (100). Some or all of geographic information, motion information, position information, velocity information, etc., acquired by these locational sensors may be used to set up a reference origin 120 (e.g., in a central portion of the reference surface, etc.), a spatial orientation, etc. of the spatial coordinate system in which the light source image (130) is represented.

In some embodiments, it is not necessary to represent the light source image (130) in relatively universal reference coordinate system. In some embodiments, for a stationary display device such as a stationary television, a stationary computer display, etc., it is adequate to represent the light source image (130) in a coordinate system in relation to spatial properties of the stationary display device.

The light source image (130) may comprise light source information such as related to some or all of spatial positions, spatial directions, intensities, colorimetric properties, etc., related to each of some or all of the light sources represented in the light source image (130).

In an example, the light map based controller (100) is configured to combine/assemble directional image sensor data (e.g., pixel data, etc.) collected by the directional image sensors to generate a two dimensional spherical image, a three dimensional image, etc.; apply a median cut filter to the generated image to identify light sources and to determine light source information such as related to some or all of locational information (e.g., spatial position, spatial orientation, longitude, latitude, distance derived from 3D diversity information, etc.), intensities, colorimetric properties, etc., related to each of some or all of the identified light sources; generate a light source image based on the light source information; etc. Some or all of these foregoing operations may be performed repeatedly, every 100 milliseconds, every 500 milliseconds, every second, on demand, in response to external or internal events/clock signals, etc.

In some embodiments, the light source image (130) may be built with pixel information that represents relatively bright pixels or bright image portions in the directional image sensor data. Thus, the directional image sensor data may, but is not required to, be of a very high dynamic range. Luminance information in the directional image sensor data can be relative (e.g., a codeword which is not luminance value but can be mapped to a luminance value) or absolute (e.g. a luminance value in $cd/m^2$ or the like). Additionally, optionally, or alternatively, the directional image sensor data may, but is not required to, be captured with high frame rates or low ISO noise, with underexposure using a low dynamic range (LDR) camera, etc.

The directional image sensor data can be captured with different exposure values (EV) and interleaved for gathering light source information in relatively high portions, etc., of a visual dynamic range (e.g., 1000 nits, 5000 nits, 12,000 nits, 20,000 nits, a luminance value of an extremely bright object, etc.). For example, some of the directional image sensor data may be captured every even times with a first exposure value suitable for capturing highlights, whereas some other of the directional image sensor data may be captured every odd times with a second exposure value suitable for capturing dark image portions. The directional image sensor data captured with different exposure values may be used together to identify where light sources are, where there exist no light sources, what light source information pertains to the light sources, etc. In some embodiments, it is acceptable to underexpose (clip the darks) the directional image data to guarantee the capture of all the highlight information (e.g. highlight cusps and textures) if the sensors involved with image capture have a limited dynamic range.

Additionally, optionally, or alternatively, techniques based on assorted pixels may be applied to trade resolution for dynamic range for the purpose of identifying light sources and determining light source information of the identified light sources. Some examples of assorted pixel based techniques are described in S. K. Nayar and T. Mitsunaga, "High Dynamic Range Imaging: Spatially Varying Pixel Exposures," IEEE Conference on Computer Vision and Pattern Recognition (CVPR), Vol. 1, pp. 472-479 (June, 2000), the contents of which are incorporated by reference herein.

In some embodiments, the light source image (130) comprises locational information 128 of a viewer (e.g., 118 of FIG. 1B, etc.) such as locational information of the viewer's head, face or eyes. The viewer (118) may represent a user who is viewing images rendered on a reference image rendering surface on a mobile phone, a video game device, a tablet computer, a television, etc., that implements the light map based controller (100). The locational information (128) of the viewer may include one or more of distance, angles, etc., of the viewer's face or eyes in relation to a reference point such as the reference origin (120), a central point of the reference image rendering surface, a normal direction of the reference image rendering surface at a central point of the reference image rendering surface, etc.

In some embodiments, the locational information (128) of the viewer may be computed or analyzed by the directed light map acquisition device (100) from a rough silhouette captured in one or more portions of the directional image sensor data. The locational information (128) can then be used by the light map based controller (100) to predict locations of light reflection areas caused by light source reflections on a (e.g., reflective, etc.) screen such as the reference image rendering surface, etc., on which images are rendered and viewed by the viewer (118).

In some embodiments, the directed light map acquisition device (100) is configured to acquire and maintain other data such as other types of sensor data, non-sensor data, reference data such as a sunlight direction at a given location at a given time, weather (overcast or sunny) at a given location at a given time, etc. The other data acquired and maintained by the directed light map acquisition device (100) can be acquired by the directed light map acquisition device (100) beforehand (e.g., before using the information to improve image rendering quality, etc.) or contemporaneously (e.g., while using the information to improve image rendering quality, etc.). Additionally, optionally, or alternatively, the directed light map acquisition device (100)—which for example may be implemented by a stationary device such as a television, etc.—can be configured to analyze the illumination trend from available and/or acquired sensor data, non-sensor data, etc., over a historical time period such as past several days, past several hours, past several minutes, etc., to estimate its location in a room, to estimate light source information, etc.

3. Example Light Map Based Controller

Figure 2:
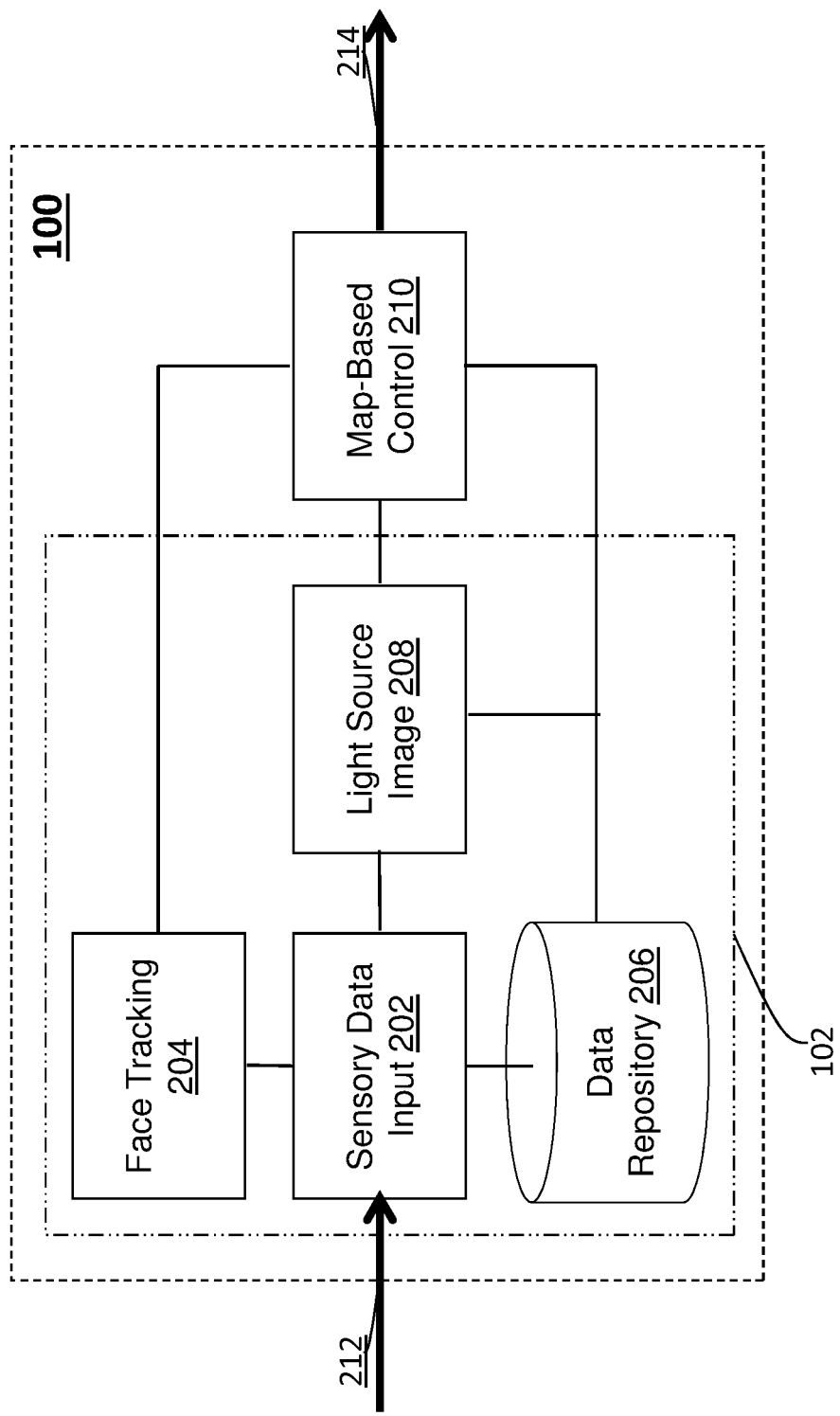
FIG. 2 depicts a block diagram of an example light map based controller.

FIG. 2 depicts a block diagram of an example light map based controller (e.g., 100 of FIG. 1A or FIG. 1B, etc.)

comprising a light source identification module (e.g., 102 of FIG. 1A, etc.), a light map-based control unit 210, etc. In some embodiments, the light source identification module (102) comprises a sensor data input unit 202, a face tracking unit 204, a data repository 206, a light source image unit 208, etc. Each of these modules, units, etc., in the light map based controller (100) may be implemented in software, hardware, a combination of software and hardware, etc.

The light map based controller (100), or the sensory data input unit (202) therein, can be configured to receive sensor data 212 (e.g., real time sensor data, near real time sensor data, etc.) from one or more of directional image sensors (e.g., 104 or 106 of FIG. 1A, etc.), locational sensors (e.g., motion sensors, position sensors, orientation sensors, gyroscopes, electronic compasses, accelerometers, GPS modules, etc.), etc.

In some embodiments, the data repository (206) represents one or more databases, one or more data storage units/modules/devices, etc., configured to support operations such as storing, updating, retrieving, deleting, etc., with respect to sensor data (e.g., 212, etc.), non-sensor data, reference data, etc.

The light map based controller (100), or the face tracking unit (204) therein, can be configured to receive one or more portions of directional image sensor data. The one or more portions of directional image sensor may be a part of the sensor data (212) received and forwarded by the sensory data input unit (202). The face tracking unit (204) may be configured to apply face tracking techniques (e.g., based on silhouette, highlights, light reflections, etc., that are characteristics of a human face, etc.) to analyses of the one or more portions of directional image sensor data. Based on results of the analyses, the face tracking unit (204) may be configured to track (e.g., in real time, in near real time, etc.) the location of a face of a viewer (e.g., 118 of FIG. 1C, etc.) in relation to a reference surface such as a reference image rendering surface, etc.

The light map based controller (100), or the light source image unit (208) therein, can be configured to receive directional image sensor data (some portions of which may also be used for face tracking purposes). The directional image sensor may be a part of the sensor data (212) received and forwarded by the sensory data input unit (202). The light source image unit (208) may be configured to analyze the directional image sensor data, identify overlaps in portions of the directional image sensor data from different directional image sensors, generate a light source image (e.g., 130 of FIG. 1C, in real time, in near real time, etc.) by applying light source detection techniques (e.g., medium cut, assorted pixels, etc.) the directional image sensor data, etc.

The light map based controller (100), or the light map-based control unit (210) therein, can be configured to receive the locational information of the viewer (118) as generated by the face tracking unit (204), the light source image (130) as generated by the light source image unit (208), retrieve other data such as reference data (e.g., a sunlight direction, weather, in real time, in near real time, etc.), etc. In some embodiments, the light source image (130) may comprise the locational information of the viewer (118), the locational information of the reference surface (e.g., the reference image rendering surface 140 of FIG. 1A, etc.), etc.

Based on some or all of the locational information of the viewer (118), the location information of the reference surface, the light source image (130), the reference data, etc., the light map based control unit (210) may be configured to construct a directional light map of the reference surface. The directional light map of the reference surface may represent a temporal spatial prediction/estimation of how ambient light is incident on and distributed over a plurality of different spatial portions of the reference surface. The directional light map may predict (e.g., based on ray tracing with respect to light from light sources, etc.) one or more of a specific ambient light direction, a specific ambient light intensity, specific ambient light colorimetric properties, etc., for any given point on some or all portions of the reference surface. The ambient light properties at various spatial portions of the reference surface may be estimated based on light source information in the light source image, reference data (e.g., the sun's position, weather conditions or forecasts applicable to the reference surface, etc.), etc. In some embodiments, a directional light map as described herein may comprise some or all of ambient light information on a reference surface that is computed/predicted/estimated based at least in part on a light source image without actual physical measurements of ambient light at the reference surface. Additionally, optionally, or alternatively, more than one directional light map may be computed/predicted/estimated based at least in part on a light source image at any given time. For example, a set of one or more directional light maps may be computed/predicted/estimated for a set of one or more reference surfaces for any given time based at least in part on a light source image.

For example, a first directional light map in the set of directional light maps may be computed/predicted/estimated for a first reference surface in the set of reference surfaces based at least in part on a light source image for the given time. A second directional light map in the set of directional light maps may be computed/predicted/estimated for a second reference surface in the set of reference surfaces based at least in part on the same light source image for the same given time. The first reference surface may be a reference image rendering surface that is an actual image rendering surface of a display device at the given time, whereas the second reference surface may be a reference image rendering surface that is not the actual image rendering surface of the display device at the given time. For example, the second reference surface may be an optimal image rendering surface to be at for the display device in order to achieve optimal image rendering results (e.g., relatively detailed images, relatively vivid colors, etc.).

Additionally, optionally, or alternatively, the light map based controller (100), or the light map-based control unit (210) therein, can be configured to generate light map based control output 214 based on the directional light map of the reference surface, and/or some or all of the data used to construct, predict, or estimate the directional light map of the reference surface.

In some embodiments, some or all of sensor data, light source images, positional information of a view's face, directed light maps with respect to reference surfaces, reference data, etc., are generated or accessed in real time, in near real time, etc. For example, some or all of sensor data as described herein may be acquired in real time through sensors of a target device (e.g., an image rendering device, a movie camera system, a colorist workstation, an automobile-based display device, etc.). A directed light map is computed in near real time (e.g., within a small time window of 10 milliseconds, 20 milliseconds, 100 milliseconds, etc., from an earliest time at which the sensor data is collected) for a spatial volume, a spatial surface (e.g., an image rendering surface of an image rendering device, etc.), etc. The directed light map is derived as a function of an image source image generated based at least in part on the sensor data in real time or in near real time. Directional light maps can be continuously (e.g., every 100 milliseconds, every 5 seconds, etc.) constructed.

In a first example, a viewer walking in an alley of changing light and dark levels, a target device (e.g., an image rendering device, a mobile phone, a video game device, a tablet computer, etc.) with the viewer may continuously generate spatial temporal directional light maps at a plurality of time points in real time. Even when the viewer's hand that is holding the device may cover up some sensors with the device (or a cover thereof), the device may be configured to continuously perform face tracking (or facial detection), assemble available sensor information to light source images, and further construct directional light maps from the light source images, time-varying locational information of the viewer, etc.

In a second example, a target device (e.g., an image rendering device, etc.) may be configured to perform history tracking and maintain/store historical data (including but not limited to trend data) of some or all of light source information, face tracking information, device positions, device orientations, etc., for one or more time intervals (e.g., 30 seconds, five minutes, etc.). The device may be configured to generate estimates/predictions of some or all of light source information, face tracking information, device positions, device orientations, etc., at any given time (e.g., in real time, in near real time, etc.) based on the historical data. For instance, at a time when some sensors of the device are blocked and some information derived from what would have been collected by the sensors is hidden or missing, the historical information collected by the device for a preceding time interval to the time may be used to predict or estimate the hidden or missing information, until the sensors are unblocked and information can again be derived from what is collected by the sensors.

Real time or near real time information regarding light sources, ambient light conditions, etc., under techniques as described herein can be repeatedly (e.g., continuously, periodically, etc.) derived, and used in diverse operational scenarios of a target to perform a variety of image-related operations (e.g., improve image rendering qualities, etc.) in real time or in near real time.

4. Display Management

Figure 3A:
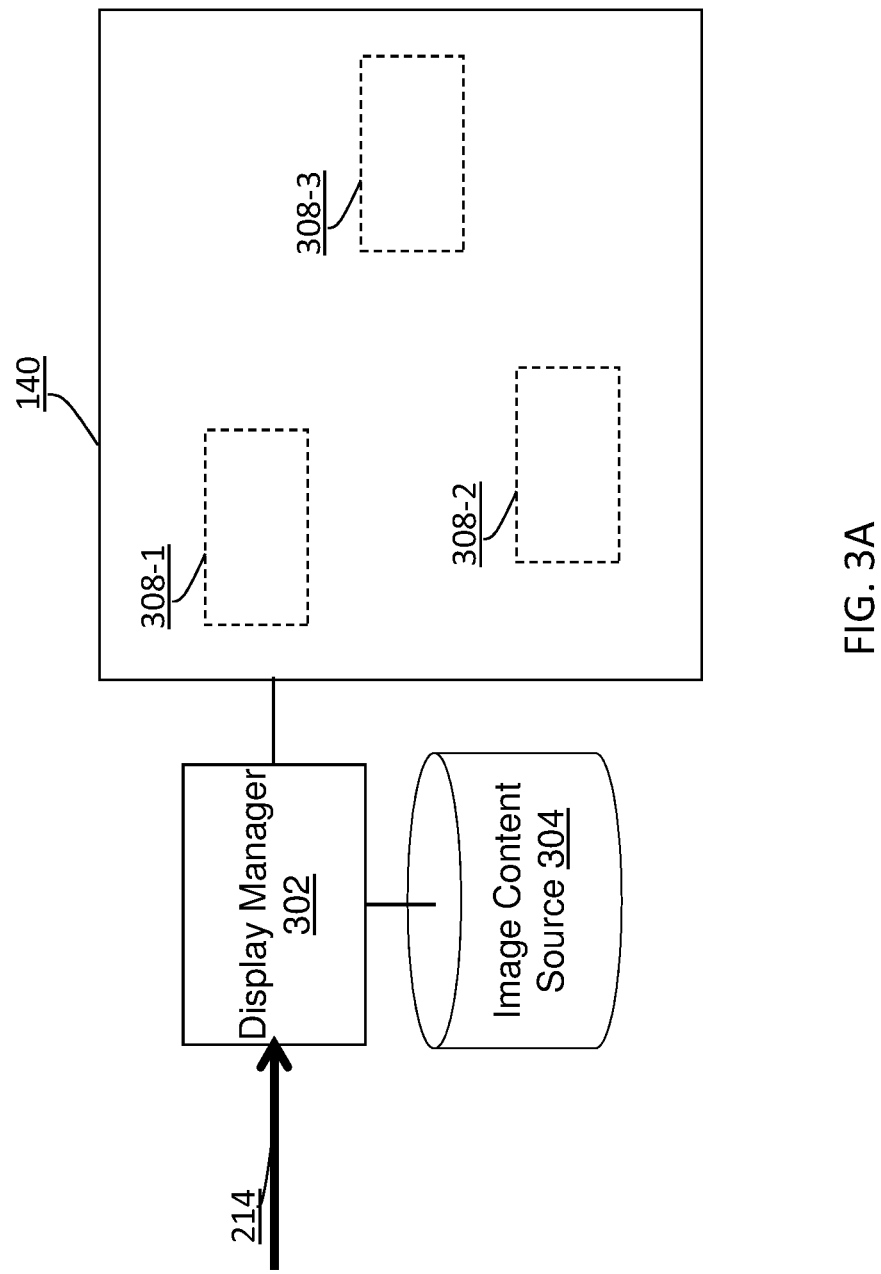
FIG. 3A illustrates an example configuration in which a display manager uses light map based control output to perform display management operations in an image rendering environment.

FIG. 3A illustrates an example configuration in which a display manager 302 uses light map based control output such as 214 of FIG. 2 to perform display management operations in an image rendering environment.

In some embodiments, the display manager (302) comprises software, hardware, a combination of software and hardware, etc., configured to receive image content from an image content source 304, receive the light map based control output (214), perform display management operations in rendering the image content on a reference image rendering surface (e.g., 140 of FIG. 1A, etc.) based at least in part on the light map based control output (214), etc.

In some embodiments, the light map based control output (214) comprises a directional light map for the reference image rendering surface at a given time when a specific image is to be rendered on the reference image rendering surface (140) by the display manager (302). Based on light source information acquired from the image rendering environment, the display manager (302) may be configured to determine/predict/estimate (e.g., various, a plurality of, etc.) ambient light properties such as light levels, light colorimetric properties, etc., at some or all locations on the reference image rendering surface (140) in the image rendering environment for the given time based on a directional light map in the light map based control output (214). In some embodiments, the display manager (302) is configured to determine optical properties such as light reflective properties, light scattering properties, light diffusion properties, glossiness, etc., of a display screen (e.g., corresponding to the reference image rendering surface, etc.), build bidirectional scattering distribution functions (BSDFs) based on the optical properties, predict/estimate the ambient light properties as perceived by a viewer based at least in part on the directional light map, the optical properties, the BSDFs, etc.

As a part of the display management operations performed by the display manager (302) in rendering the specific image on the reference image rendering surface (140), the display manager (302) may be further configured to set different black levels, different contrast settings, different white points, different primary colors, etc., in different portion of the specific image on the reference image rendering surface (140) based on different ambient light properties predicted from the directional light map. In some embodiments, some or all of black levels, contrast settings, white points, primary colors, etc., in various portions of the specific image may be computed as functions of the ambient light conditions of various portions of an image rendering surface, where the various portions of the image rendering surface respectively correspond to the various portions of the specific image. As used herein, a portion of an image may refer to one or more of: pixels, pixel blocks, regular shapes each comprising a plurality of pixels, irregular shapes each comprising a plurality of pixels, etc.

For example, the directional light map may comprise predictions/estimations for a relatively low ambient light level (e.g., corresponding to a light reflection of a relatively low intensity, etc.) at a first surface portion 308-1, a medium ambient light level (e.g., corresponding to a light reflection of a medium intensity, etc.) at a second surface portion 308-2, a relatively high ambient light level (e.g., corresponding to a light reflection of a relatively high intensity, etc.) at a third surface portion 308-3. Based on these predictions/estimations of the directional light image, the display manager (302) may be configured to set a relatively low black level, a normal contrast setting, etc., in the first surface portion (308-1), set a medium black level, a higher than the normal contrast setting in the second surface portion (308-2), set a relatively high black level, a much higher than the normal contrast setting in the third surface portion (308-3), etc.

Additionally, optionally or alternatively, the directional light map may comprise predictions/estimations for ambient light colorimetric properties at the first surface portion (308-1), the second surface portion (308-2), the third surface portion (308-3), etc. Based on these predictions/estimations of the directional light image, the display manager (302) may be configured to set different color appearances (e.g., through different white points, different primary colors, etc.) in the first surface portion (308-1), the second surface portion (308-2), the third surface portion (308-3), etc.

In some embodiments, at least some of the display management operations performed by the display manager (302) in dependence on the directed light map may be performed (e.g., without altering pixel values of the specific image, in combination with altering pixel values of the specific image, etc.) through global dimming, through local dimming, by adjusting backlight at or near different portions of the image rendering surface, etc. In some embodiments, at least some of the display management operations performed by the display manager (302) in dependence on the directed light map may be performed through tone mapping, inverse mapping, etc., that alters pixel values of the specific image at different portions of the specific image that respectively correspond to different portions of the image rendering surface.

Additionally, optionally, or alternatively, the light map based control output (214) comprises ambient light information other than those computed for the reference image rendering surface (140). In an example, the light map based control output (214) may comprise light source information that indicates a strong light (e.g., an incoming vehicle's headlight, sunlight, etc.) is directing towards the viewer's sight without being reflected from the reference image rendering surface (140). In some embodiments, the reference image surface (140) may be automatically repositioned or tilted to a location at which the strong light is not directing towards the viewer's sight. In another example, the light map based control output (214) may comprise light source information that can be used to determine or generate perceptual effect of the background and surround behind the reference image rendering surface (140). For example, a system as described herein may determine that the reference image rendering surface (140) (e.g., a display screen or the like) has a bright green background that generates a perceptual effect of making the display screen to look different than a darker red. This can be computed by the system using, for example, a color or image appearance model.

5. Device Location Management

Figure 3B:
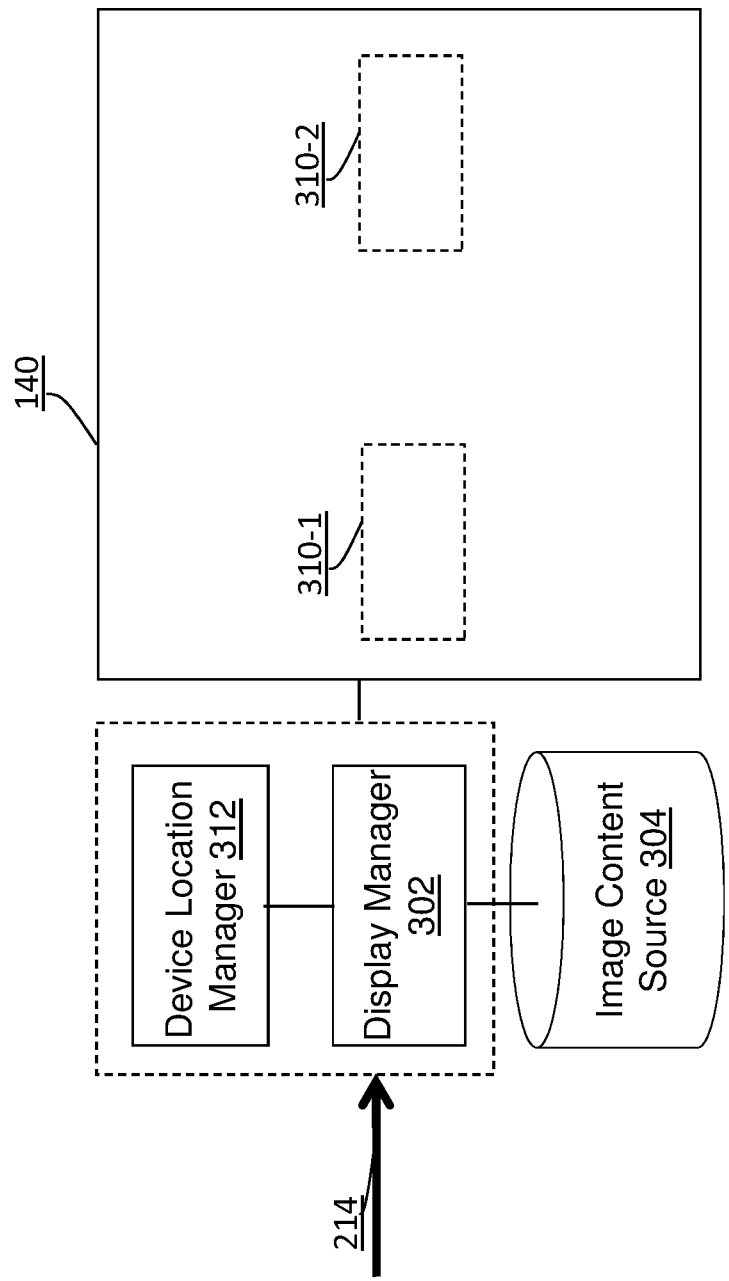
FIG. 3B illustrates an example configuration in which a display manager and a device location manager use light map based control output to perform display management operations, device location operations.

FIG. 3B illustrates an example configuration in which a display manager (e.g., 302 of FIG. 1A, etc.), a device location manager 312, etc., use light map based control output such as 214 of FIG. 2 to perform one or more of display management operations, device location operations, etc.

In some embodiments, the device location manager (312) comprises software, hardware, a combination of software and hardware, etc., configured to receive image content from an image content source 304, receive the light map based control output (214), perform location management operations that relocates, reorient, etc., a reference image rendering surface (e.g., 140 of FIG. 1A, etc.) based at least in part on the light map based control output (214), etc.

In some embodiments, the light map based control output (214) comprises two or more directional light maps for two or more reference surfaces at a given time when a specific image is to be rendered on the reference image rendering surface (140) by the display manager (302). The directional light maps for the reference surfaces may include a first directional light map for the reference image rendering surface (140), a second directional light map for a second reference surface other than the reference image rendering surface (140). The first directional light map may comprise predictions/estimations of intense directional light (e.g. sunlight) hitting some portions of a display screen represented by the reference image rendering surface (140). The second reference surface may be an optimal image rendering surface to be at for the reference image rendering surface (140) in order to achieve optimal image rendering results (e.g., relatively detailed images, relatively vivid colors, etc.).

In some embodiments, the light map based control output (214), or the second directional light map therein, comprises locational information of the second reference surface. Based at least in part on the locational information (e.g., a position, a surface orientation, etc.) of the second reference surface, the location manager (312) may be configured to cause the reference image rendering surface (140) to reposition itself into (e.g., at, near, within specific error thresholds for positions and orientations from, etc.) the second reference surface.

In a first non-limiting example, based at least in part on the locational information (e.g., a position, a surface orientation, etc.) of the second reference surface, the location manager (312) may be configured to generate locational control output to one or more mechanical components (e.g., actuators, motors, movable parts, rotatable parts, etc.) to automatically relocate to the reference image rendering surface (140) to the second reference surface which may be constrained to a range of positions, orientations, etc., that are supported by the one or more mechanical components. This may be done for example for a television in a home theater environment, for a dashboard display in an automobile (e.g., to avoid glares on the dashboard display caused by incident light from a light source such as a headlight of a car from behind, etc.), for a display device in a backseat area of a minivan, etc.

In a second non-limiting example, based at least in part on the locational information (e.g., a position, a surface orientation, etc.) of the second reference surface, the location manager (312) may be configured to generate user interface output to inform a user of the existence of the second reference area to which the reference image rendering surface (140) may be optimally relocated. Examples of user interface output may include, but are not limited to only, any of: one or more audible alerts (e.g., buzzes, etc.), haptic alerts (e.g., vibrations, etc.), visual alerts (e.g., visual indicators rendered (e.g., near edges, graphic overlays, transparent overlays, etc.) on the reference image rendering surface (140), etc. In some embodiments, vibration actuators/motors distributed with a target device (e.g., a mobile phone, a video game device, etc.) may guide a viewer/user haptically (e.g., via feeling the vibrations, etc.) to reposition the target device to the best viewing angle, the best viewing position, etc.

In some embodiments, the user interface output may provide feedbacks to the viewer/user for better positioning, for better reorientation, etc., of the reference image rendering surface. The feedbacks may include, but are not limited to only, variable user perceptible information (e.g., volume, audible frequencies, colors, light flashing, etc.) about a severity level in image rendering quality deterioration associated with the current position of the reference image rendering surface, about an extent of improvement in image rendering quality improvement associated with the second reference surface, etc.

In some embodiment, one or more arrows such as 310-1, 310-2, which may be straight arrows, clockwise circular arrows, counterclockwise circular arrows, etc., can be (e.g., continuously, etc.) rendered on the reference image rendering surface (140) until the user turns off device positioning alerts (e.g., similar to turning off an actively buzzing alarm on a mobile phone, etc.), or until the reference image rendering surface (140) is repositioned into (e.g., at, near, within specific error thresholds for positions and orientations from, the second reference surface, a location at which glares disappear, etc.) a final location where ambient light conditions on the reference image rendering surface are optimal or acceptable. Perceptual cues (e.g., alarm sounds, an audible or visual message such as "move to the left," "tilting to the right", etc.) for repositioning, reorientation, etc., may be given to the viewer as the viewer is adjusting the reference image rendering surface, until the reference image rendering surface (140) is repositioned into the final location.

Additionally, optionally, or alternatively, the display manager (302) may be configured to determine (e.g., various, a plurality of, etc.) ambient light properties such as light levels, light colorimetric properties, etc., at some or all locations on the reference image rendering surface (140) based on a directional light map (e.g., continuously provided, etc.) in the light map based control output (214) of the reference image rendering surface (140), and performs corresponding display management operations based on these ambient light properties, at one or more time points while the reference image rendering surface (140) is being repositioned, reoriented, etc.

6. Perspective Rendering

In some embodiments, at a location to which the reference image rendering surface (140) is adjusted, the viewer has a frontal view of the reference image rendering surface (140). For example, the viewer's face may be located at or around a normal direction (e.g., at a central portion, etc.) of the reference image rendering surface (140); the tilt angle between a line of sight of the viewer and the normal direction is zero degree, or alternatively within a normal range of 5 degrees, 10 degrees, etc. However, in some scenarios, at a location to which the reference image rendering surface (140) is adjusted, the viewer may not have a frontal view of the reference image rendering surface (140); the tilt angle between the line of sight of the viewer and the normal direction is not zero degree, or alternatively exceeds a normal range of 5 degrees, 10 degrees, etc. As used herein, a line of sight (of the viewer) may represent an imaginary line from the viewer's face to (e.g., a central point of, etc.) the reference image rendering surface (140).

Figure 3C:
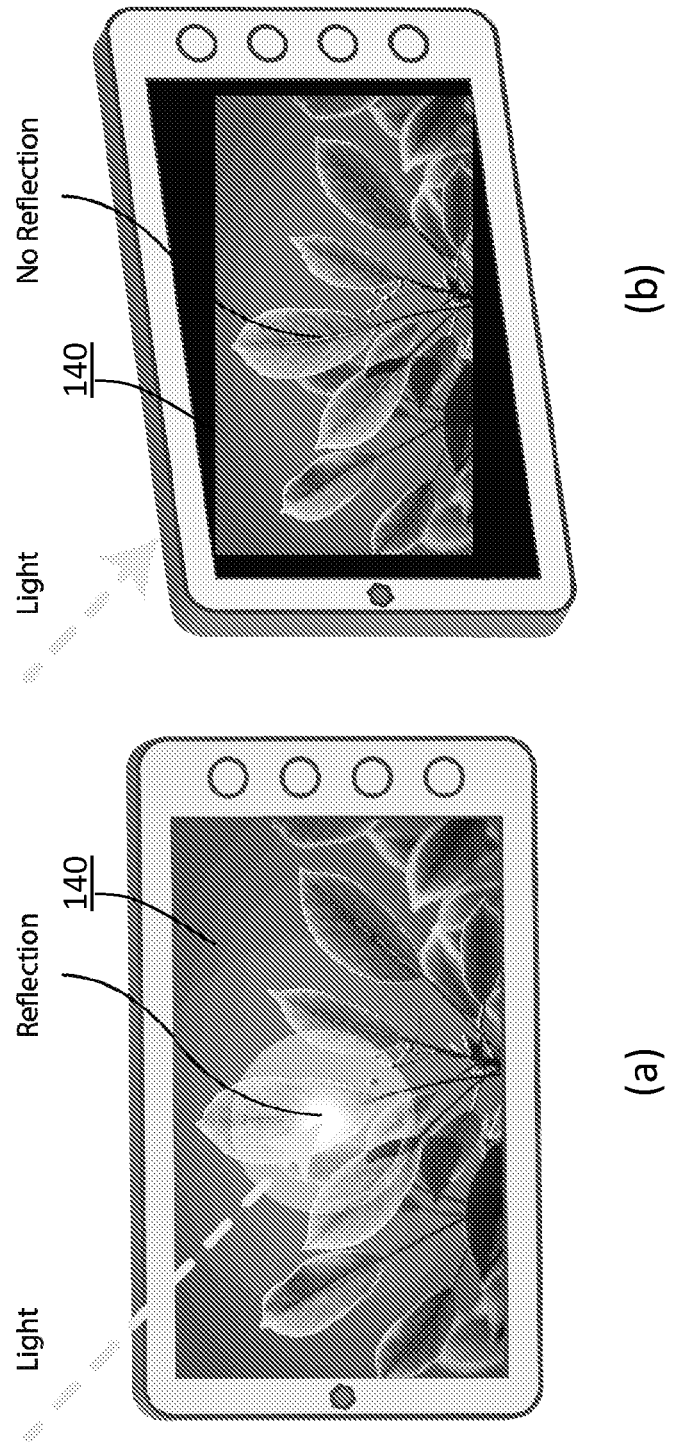
FIG. 3C illustrates example reference image rendering surfaces respectively in a frontal view with glares and in a tilted view.

FIG. 3C (a) illustrates an example reference image rendering surface (140) initially at a location at which the user has a frontal view but with a relatively high intensity glare. FIG. 3C (b) illustrates the same reference image rendering surface (140) that has been adjusted to a location at which there is no high intensity glare but the user no longer has a frontal view.

In some embodiments, the display manager (302) may be configured to determine a tilt angle for the line of sight (of the viewer) from the viewer's face to (e.g., a central point of, etc.) the reference image rendering surface (140), and render at least a portion (e.g., a majority portion, a salient portion, 90%, 80%, etc.) of the image, where the rendered portion of the image is in perspective with the line of sight of the viewer. As used herein, a rendered portion of an image, as rendered on a tilted image rendering surface, in perspective with a line of sight may mean that the rendered portion of the image is perceptually the same or equivalent to a rendered portion of the same image as rendered on a non-tilted image rendering surface (the user would have a frontal view of the non-tilted image rendering surface. This type of perceptive rendering of an image on a tilted image rendering surface may be beneficial when the target device has a high resolution screen such as a hiDPI or "Retina" type screen. A pixel on an image to be rendered on a non-tilted image rendering surface may be stretched (e.g., upsampled, interpolated, etc.) to more than one pixel (e.g., 1.2 pixels, 1.5 pixels, 2 pixels, etc.) for the purpose of compensating the tilt angle of a tilted image rendering surface. Additionally, optionally, or alternatively, as a part of perceptual rendering, geometric adjustments may be made to rotate the rendered portion of the image on the tilted reference image rendering surface (140). In some embodiments, when perspective rendering operations are performed and the rendered portion of the image may no longer be aligned with the physical boundary of the tilted image rendering surface (140), some portions (e.g., one or more triangular portions, one or more bars, etc.) of the display screen may be painted black or some other specific colors/patterns/textures, as illustrated in FIG. 3 (b).

Perspective rendering operations as described herein can be performed by the target device in real time or in near real time. For example, while a viewer sits in a car, a dashboard display (or an instrument panel) may be tilted by a target device that controls image rendering on the dashboard display. The target device may detect, predict, estimate, etc., from a directional light map, light source information in a light source image, a GPS assisted estimation of ambient light, the actual BSDF properties of the display, etc., that strong glares occur or are to occur on the dashboard display. Some or all of the directional light map, the light source information, the light source image, the GPS assisted estimation of ambient light, etc., may be generated or derived at least in part based on information acquired from one or more of surround cameras (e.g., for parking related operations or collision warnings, etc.), GPS units/modules/devices, other motion sensors, reference road maps, etc. In response to detecting that strong glares occur or are to occur, the target device may automatically tilt the dashboard display and render images in perspective with lines of sight of the viewer when these images are rendered on the tilted dashboard display.

Additionally, optionally or alternatively, perspective rendering as described herein (e.g., with respect to a rendered portion of an image on a tilted display screen, etc.) can be applied to rendering augmented reality objects (e.g., objects that are superimposed onto images, etc.), text (e.g., closed caption texts overlaid with images, etc.), computer-generated graphics (e.g., advertisement messages, labels, posters, signs, etc.) overlaid with images, etc., in perspective with lines of sight of the viewer when these images are rendered with a target device such as the tilted dashboard display in the present example.

7. Augmented Reality

Figure 3D:
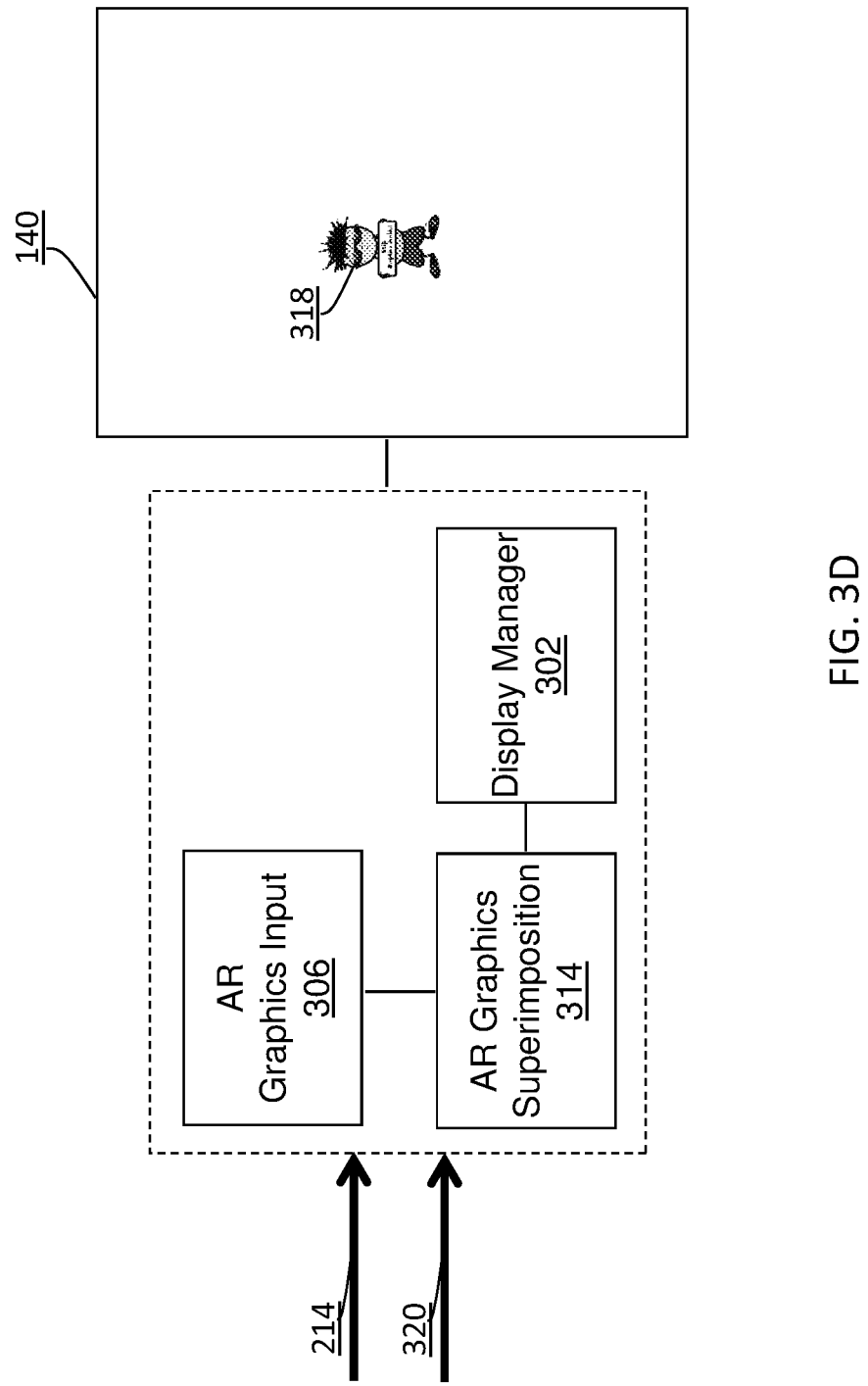
FIG. 3D illustrates an example configuration in which an augmented reality graphics superimposition unit uses light map based control output to perform graphics superimposition operations.

FIG. 3D illustrates an example configuration in which an augmented reality (AR) graphics superimposition unit 314 uses light map based control output such as 214 of FIG. 2 to perform AR graphics superimposition operations. As used herein, AR graphics may refer to graphics that depict one or more AR objects or persons. An AR object or person may be derived from other images other than the images to be superimposed with. An AR object or person may also be derived from computer generated graphics.

In some embodiments, the AR graphics superimposition unit (314) comprises software, hardware, a combination of software and hardware, etc., configured to receive image content 320, receive the light map based control output (214), receive AR graphics (e.g., 318, etc.) from an AR graphics input unit (306), perform the AR graphics superimposition operations that superimpose or overlay the AR graphics (318) with the image content to generate AR superimposed image content, etc. In some embodiments, the AR graphics (318) is superimposed with the image content based at least in part on the light map based control output (214), etc. In some embodiments, an AR object or person superimposed into an image under techniques as described herein may be created/generated not based on the same light sources as represented by the light map based control output (214).

In some embodiments, the light map based control output (214) and the image content (320) (e.g., collectively, in respective sub-bitstreams of an overall media data bitstream, etc.) may be carried by and decoded from a media data bitstream. The light map based control output (214) may comprise a light source image captured/acquired contemporaneously when an image of the image content (320) was originally created. The AR graphics superimposition unit (314) may be configured to determine/predict/estimate (e.g., using image based lighting techniques based on a spherical image or a light source image, etc.) light conditions on an AR object of the AR graphics (318) as if the AR object were originally at a superimposed position at an original scene from which the image to be superimposed with was captured and from which the light source image was acquired/generated, and superimpose the AR object realistically (as if the AR object were originally at the superimposed position at the scene in terms of highlight areas, mid-tone areas, dark areas, temporal spatial dependent colorimetric properties, etc.) into the image based on the predicted/estimated light condition on the AR object.

Additionally, optionally, or alternatively, the AR graphics superimposition unit (314) may operate with a display manager (e.g., 302 of FIG. 3A or FIG. 3B, etc.) to render the AR superimposed image content on a reference image rendering surface (e.g., 140 of FIG. 1A, etc.).

AR techniques as described herein can be applied to a variety of display-related applications such as interactive game applications, virtual reality applications, applications deployed with head up displays, etc.

In an example, the image may be taken at the scene in Burbank, Calif., whereas the AR object or person (e.g., an actor, etc.) may be a part of image taken at a place other than the scene. The light source image acquired when the image was taken at the scene may indicate that there is glowing lava near the location at which the AR object or person is to be superimposed. Accordingly, the AR object or person may be realistically superimposed based on the light source image to indicate highlights and colors caused by the AR object or person being near the glowing lava, as if the AR object or person was derived from a different image in which no glowing lava existed.

In another example, an AR object or person may be captured from images from a first location of a video conference and superimposed realistically into images captured at a second location of the video conference as if the AR object or person were realistically at the second location of the video conference.

In some embodiments, to save transmission bandwidth, a light source image may be represented in a relatively compact form using non-pixel data constructs (e.g., in a detailed or find representation, in an approximate or coarse representation, etc.). For example, the light source image may be represented by a few, a few tens, etc., of vectors that represent light sources as detected from directional image sensor data (e.g., at the scene, etc.). In some embodiments, the light source image may comprise a few tens of vector points, a few hundreds of bytes, up to 30 kB, etc., and may be carried as scene metadata in a media data stream with other data such as the image that was captured by the light sources as represented by the light source image. In various embodiments, light source images can be periodically (e.g., every 100 milliseconds, etc.), constantly, sporadically, etc., generated at a scene. Some or all of these light source images generated at the scene may be included as scene metadata in a media data stream that also is encoded with images taken at the scene. Additionally, optionally, or alternatively, a media data stream as described herein may be transmitted from an upstream device to a recipient device such as on that includes the AR graphics superimposition unit (314) in any of a variety of ways (e.g., over-the-air, over the cable, internet downloading, streaming from a media content server, etc.).

8. Ambient Light Control

FIG. 3E illustrates an example configuration in which an ambient light control unit 322 uses light map based control output such as 214 of FIG. 2 to perform ambient light control operations in an image rendering environment in which images are rendered.

In some embodiments, the ambient light control unit (322) comprises software, hardware, a combination of software and hardware, etc., configured to receive image content 320, receive the light map based control output (214), perform the ambient light control operations that cause setting up specific ambient light conditions in the image rendering environment for rendering specific images in the received image content (320) in the image rendering environment, etc. Additionally, optionally, or alternatively, the ambient light control unit (322) may operate with a display manager (e.g., 302 of FIG. 3A or FIG. 3B, etc.) to render the image content on a reference image rendering surface (e.g., 140 of FIG. 1A, etc.).

In some embodiments, the light map based control output (214) and the image content (320) (e.g., collectively, in respective sub-bitstreams of an overall media data bitstream, etc.) may be carried by and decoded from a media data bitstream.

In an example, the light map based control output (214) may comprise a light source image captured/acquired contemporaneously when an image of the image content (320) was color graded in a color grading environment. The ambient light control unit (322) may be configured to set up ambient light conditions in the image rendering environment (e.g., a home theater, etc.) using light source information in a light source image, etc. As a result, as the image is being rendered, the image is viewed in the image rendering environment that simulates the ambient light conditions of a viewing environment in which the image was color graded in the color grading environment, etc. This, for example, allows the original artistic intent in the color grading of the image in the color grading environment to be conveyed to the viewer with high fidelity to a much greater extent.

Ambient light control as described herein may be applied to a variety of image rendering environments. For instance, ambient light control may be implemented in an image rendering environment in an automobile, a vehicle, a ship, an airplane, etc. Light sources (e.g., light emitters such as white or color LEDs installed in a cabin, in a ceiling, wall, etc., of an interior space, etc.) in the image rendering environment may be automatically controllable based on ambient light control generated under techniques as described herein to generate ambient light conditions specified in the light map based control output (214).

Ambient light control may also be implemented in an image rendering environment in which live content is being rendered. For instance, ambient light control may be implemented in an image rendering environment in a video conference. Light source information at a near-end of the video conference may be provided in light source images (e.g., in the light map based control output (214), etc.) from the near-end to one or more far-ends. At the one or more far-ends, the light source information received from the near-end may be used to control ambient light conditions at the one or more far-ends. Similarly, light source information at a far-end of the video conference may be provided in light source images (e.g., in the light map based control output (214), etc.) from the far-end to a near-end. At the near-end, the light source information received from the far end may be used to control ambient light conditions at the near-end.

In some embodiments, the light map based control output (214) may comprise optical properties of a display screen with which the color grading operations in the color grading environment were performed. A target device (e.g., an image rendering device, a dashboard display, a head up display device, etc.) as described herein may comprise one or more optical property control mechanisms that can be used in an image rendering environment to simulate the optical properties (e.g., light transmissive properties, light reflective properties, light scattering properties, light diffusive properties, etc.) of the display screen in the color grading environment. Examples of optical property control mechanisms may include, but are not necessarily limited to, any of: optical polarizers, light modulation layers, optical films, etc.

In some embodiments, some or all of light sources in an image rendering environment may be controlled with interaction with a viewer/user rather than controlled automatically without user interaction. For example, in response to a target device (e.g., an image rendering device, etc.) receiving and/or the target device generating light source information, which light source information indicates that one or more specific light sources in the image rendering environment should be adjusted in specific ways or turned off, the target device may be configured to generate user interface output to inform a user that the light source should be adjusted in specific ways or turned off. Examples of user interface output may include, but are not limited to only, any of: one or more audible alerts (e.g., buzzes, etc.), haptic alerts (e.g., vibrations, etc.), visual alerts (e.g., visual indicators rendered (e.g., near edges, graphic overlays, transparent overlays, etc.) on the reference image rendering surface (140), etc. In an example, specific adjustments or turning off of one or more specific light sources via user interaction may be for the purpose of simulating target ambient light conditions of a scene, a color grading environment, a far-end of a video link, etc. In another example, specific adjustments or turning off of one or more specific light sources via user interaction may be for the purpose of eliminating unfavorable ambient light conditions (e.g., glare, sunlight, incoming headlights, etc.) in the image rendering environment. The target device may be configured to provide feedbacks to the viewer/user whether the ambient light conditions match or approximate target ambient light conditions within a tolerance range and/or whether the ambient light conditions are optimal for rendering images with high fidelity.

9. Example Process Flows

Figure 4:
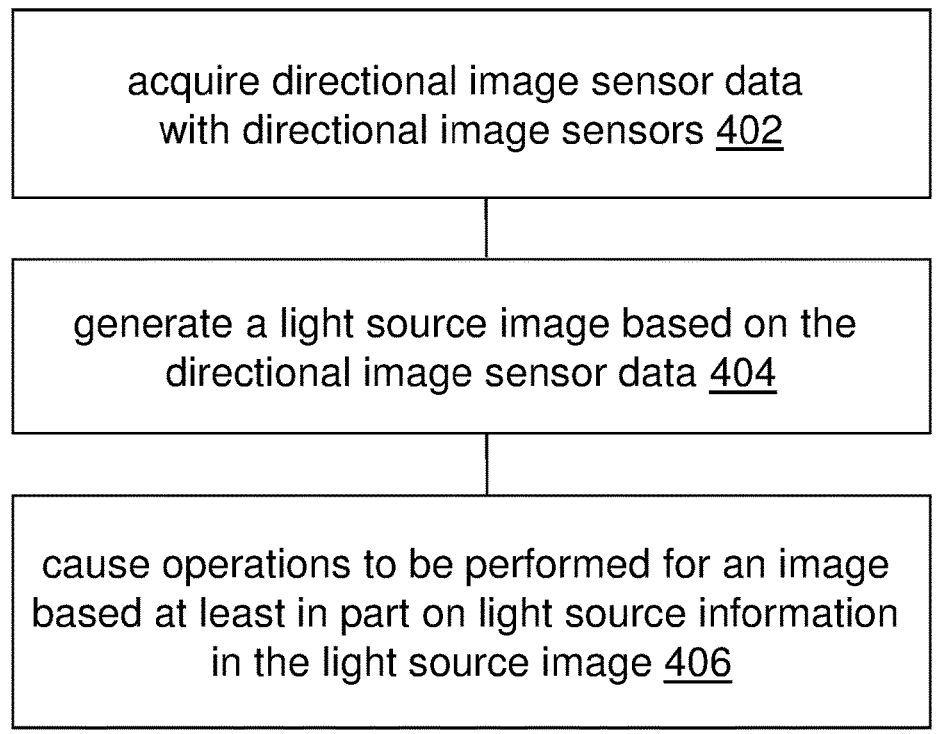
FIG. 4 illustrate example process flows.

FIG. 4 illustrates an example process flow according to an example embodiment of the present invention. In some example embodiments, one or more computing devices or components may perform this process flow. In block 402, a target device, or a light map based controller (e.g., 100 of FIG. 1A or FIG. 1B, etc.) therein, acquires directional image sensor data with one or more directional image sensors.

In block 404, the target device generates a light source image based on the directional image sensor data.

In block 404, the target device causes one or more operations to be performed for an image based at least in part on light source information in the light source image.

In an embodiment, the light source image is generated in real time as the directional image sensor data is being collected; at least one of the one or more operations is performed in real time or in near real time with generating the light source image based on the directional image sensor data.

In an embodiment, the one or more operations are performed with one or more of: a mobile phone device, a video game device, a television, a tablet computer, a heads up display (HUD) device, a dashboard display device, a display device operating in conjunction with one or more computers, a display device in a vehicle, a movie studio system, a home theater system, a color grading system, etc.

In an embodiment, the one or more operations comprise one or more of: display management operations to render the image in an image rendering environment, device positional operations to reposition an image rendering surface of an image rendering device, augmented reality operations to superimpose an object or person into the image, control operations to control ambient light conditions in an image rendering environment, etc.

In an embodiment, the one or more directional image sensors comprises one or more of: built-in cameras, external cameras, directional image sensors disposed with an accessory to a computing device, non-camera directional image sensors, CMOS-based directional image sensors, CCD-based directional image sensors, nanotube-based directional image sensors, LED-based image sensors, solar cell arrays, quantum dot photoconductors, photodiodes, polymer-based image sensors, combinations of two or more types of directional image sensors, etc.

In an embodiment, the light source image represents one of: low spatial resolution light source images, medium spatial resolution light source images, high spatial resolution light source images, spherical images, non-spherical images, 3D images, etc.

In an embodiment, the light source image comprises one of: pixel data, non-pixel-data, etc.

In an embodiment, the light source image comprises one or more of: light directions, light color maps, light intensity maps, etc.

In an embodiment, the target device is further configured to compute, based at least in part on the light source image, one or more of: dominant light sources, dominant light directions, dominant light illumination sizes, dominant light reflection sizes, light colors, light intensities, a position of a viewer's head, etc.

In an embodiment, the target device is further configured to compute, in reference to a viewer, one or more directional light maps based at least in part on the light source information.

In an embodiment, the directional light maps comprise a directional light map for one of: a reference image rendering surface, a surface other than a reference image rendering surface, a spatial volume, etc.

In an embodiment, the directional light maps comprise a directional light map that is computed based on one or more of: a location of the viewer, a reference surface, optical properties of a display screen, the light source information, etc.

In an embodiment, the light source map is represented in a coordinate system that is one of: a relative coordinate system in relation to a reference image rendering surface, a coordinate system in relation to a universal coordinate system independent of a reference image rendering surface, etc.

In an embodiment, the target device is further configured to relocate the light source map in the coordinate system based on locational sensor data collected by one or more of: motion sensors, position sensors, orientation sensors, gyroscopes, electronic compasses, accelerometers, GPS modules, etc.

In an embodiment, the light source image is generated in an image rendering environment; the target device is further configured to perform: determining, based at least in part on the light source image, ambient light conditions incident on an image rendering surface; estimating, based on the ambient light condition incident on the image rendering surface in combination with reflection and scattering properties of the image rendering surface, a prediction of how the ambient light conditions affect image qualities for images rendered on the image rendering surface; based on the prediction, setting one or more of black levels, contrast settings, white points or primary colors differently in different spatial portions of the image rendering surface in dependence on different ambient light conditions in the different spatial portions of the image rendering surface; etc.

In an embodiment, the light source image is generated in an image rendering environment; the target device is further configured to perform: determining, based at least in part on the light source image, first ambient light conditions on an image rendering surface and second ambient light conditions on a surface other than the image rendering surface; determining that the second ambient light conditions on the surface are better than the first ambient light conditions on the image rendering surface; automatically repositioning a display screen of an image rendering device to the surface with the second ambient light conditions; rendering one or more images on the display screen of the image rendering device at the surface with the second ambient light conditions; etc.

In an embodiment, the light source image is generated in an image rendering environment; the target device is further configured to perform: determining, based at least in part on the light source image, first ambient light conditions on an image rendering surface and second ambient light conditions on a surface other than the image rendering surface; determining that the second ambient light conditions on the surface are better than the first ambient light conditions on the image rendering surface; interacting with a viewer of an image rendering device to cause the viewer to reposition a display screen of the image rendering device to the surface with the second ambient light conditions; rendering one or more images on the display screen of the image rendering device at the surface with the second ambient light conditions; etc.

In an embodiment, the light source image is generated at a color grading environment where an image is color graded; the one or more operations are ambient light control operations performed in an image rendering environment based at least in part on the light source image, one or more ambient light.

In an embodiment, the light source image is generated at a scene where an image is captured; the target device is further configured to perform: receiving an image representation of an object or person independent of the image; superimposing the image representation of the object or person into the image; changing, based at least in part on the light source image, one or more image portions of the image representation of the object or person as superimposed into the image to one or more of: highlights, mid-tones, or dark areas; etc.

In an embodiment, the target device is further configured to change, based at least in part on the light source image, one or more of white points or primary colors for one or more image portions of the image representation of the object or person as superimposed into the image.

In an embodiment, the scene is at a specific location of a video conference; the object or person represents a participant not at the specific location of the video conference.

In an embodiment, the target device is further configured to perform: detecting incoming light in a viewer's viewing angle; moving an image rendering surface away from a direction of the incoming light to a direction different from the direction of the incoming light; rendering one or more images on the image rendering surface in the direction different from the direction of the incoming light; etc.

In an embodiment, the target device is further configured to perform: tilting a display screen in relation to a viewer's viewing angle; rendering at least a portion of an image on the tilted display screen that looks perceptually same as if the portion of an image were rendered on the display screen not tilted in relation to the viewer's viewing angle; etc.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
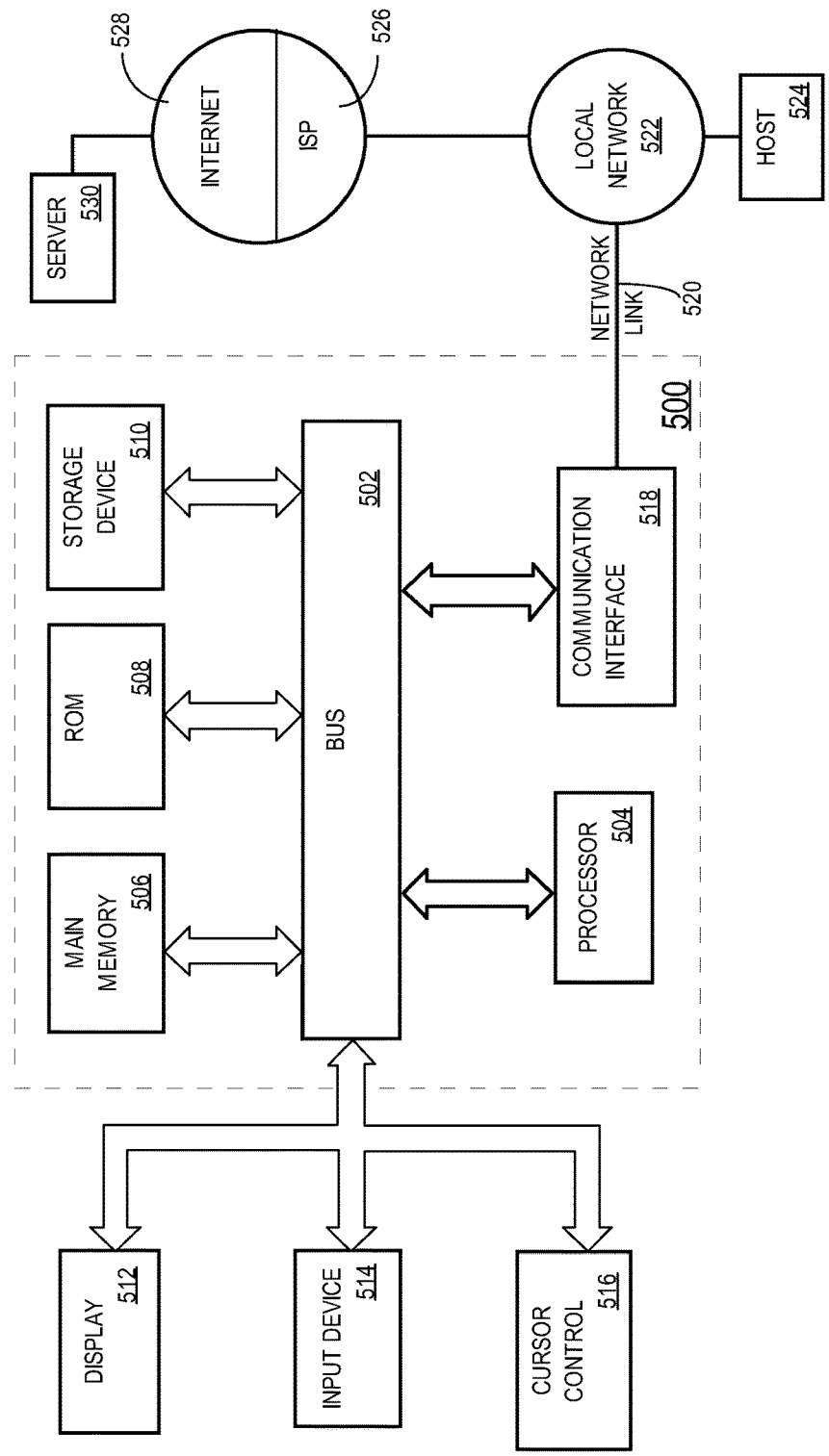
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

11. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   acquiring directional image sensor data with one or more directional image sensors;
   generating a light source image based on the directional image sensor data;
   causing one or more operations to be performed for an image based at least in part on light source information in the light source image;
   wherein the method is performed by one or more computing devices;
   wherein the light source image is generated in an image rendering environment, and further comprising:
   determining, based at least in part on the light source image, ambient light conditions incident on an image rendering surface;
   estimating, based on the ambient light condition incident on the image rendering surface in combination with reflection and scattering properties of the image rendering surface, a prediction of how the ambient light conditions affect image qualities for images rendered on the image rendering surface;
   based on the prediction, setting one or more of black levels, contrast settings, white points or primary colors differently in different spatial portions of the image rendering surface in dependence on different ambient light conditions in the different spatial portions of the image rendering surface.

2. A method, comprising:
   acquiring directional image sensor data with one or more directional image sensors;
   generating a light source image based on the directional image sensor data;
   causing one or more operations to be performed for an image based at least in part on light source information in the light source image;
   wherein the method is performed by one or more computing devices;
   wherein the light source image is generated in an image rendering environment, and further comprising:
   determining, based at least in part on the light source image, light conditions in at least one portion of a background or surround of an image rendering surface;
   estimating, based on the light condition in the at least one portion of the background or surround of the image rendering surface, a prediction of how the light condition in the at least one portion of the background or surround affect image qualities for images rendered on the image rendering surface;
   based on the prediction, setting one or more of black levels, contrast settings, white points or primary colors in one or more spatial portions of the image rendering surface in dependence on the light condition in the at least one portion of the background or surround of the image rendering surface.

3. The method of claim 1, wherein the one or more directional image sensors are configured to capture or sense directional light and to generate directional image sensor data with a determined spatial resolution.

4. The method of claim 1, wherein the one or more directional image sensors are located outside an image rendering surface.

5. The method of claim 1, wherein the light source image is generated in real time as the directional image sensor data is being collected, and wherein at least one of the one or more operations is performed in real time or in near real time with generating the light source image based on the directional image sensor data.

6. The method of claim 1, wherein the one or more operations are performed with one or more of: a mobile phone device, a video game device, a television, a tablet computer, a heads up display (HUD) device, a dashboard display device, a display device operating in conjunction with one or more computers, a display device in a vehicle, a movie studio system, a home theater system or a color grading system.

7. The method of claim 1, wherein the one or more operations comprise one or more of: display management operations to render the image in an image rendering environment, device positional operations to reposition an image rendering surface of an image rendering device, augmented reality operations to superimpose an object or person into the image, or control operations to control ambient light conditions in an image rendering environment.

8. The method of claim 1, wherein the one or more directional image sensors comprises one or more of: built-in cameras, external cameras, directional image sensors disposed with an accessory to a computing device, non-camera directional image sensors, CMOS-based directional image sensors, CCD-based directional image sensors, nanotube-based directional image sensors, LED-based image sensors, solar cell arrays, quantum dot photoconductors, photodiodes, polymer-based image sensors, or combinations of two or more types of directional image sensors.

9. The method of claim 1, wherein the light source image represents one of: low spatial resolution light source images, medium spatial resolution light source images, high spatial resolution light source images, spherical images, non-spherical images, or 3D images.

10. The method of claim 1, wherein the light source image comprises one of: pixel data or non-pixel-data.

11. The method of claim 1, wherein the light source image comprises one or more of: light directions, light color maps, or light intensity maps.

12. The method of claim 1, further comprising computing, based at least in part on the light source image, one or more of: dominant light sources, dominant light directions, dominant light illumination sizes, dominant light reflection sizes, light colors, light intensities, or a position of a viewer's head.

13. The method of claim 1, further comprising computing, in reference to a viewer, one or more directional light maps based at least in part on the light source information.

14. The method of claim 13, wherein the directional light maps comprise a directional light map for one of: a reference image rendering surface, a surface other than a reference image rendering surface, or a spatial volume.

15. The method of claim 13, wherein the directional light maps comprise a directional light map that is computed based on one or more of: a location of the viewer, a reference surface, optical properties of a display screen, or the light source information.

16. The method of claim 1, wherein the light source map is represented in a coordinate system that is one of: a relative coordinate system in relation to a reference image rendering surface, or a coordinate system in relation to a universal coordinate system independent of a reference image rendering surface.

17. The method of claim 1, further comprising repositioning or reorienting the light source map in the coordinate system based on locational sensor data collected by one or more of: motion sensors, position sensors, orientation sensors, gyroscopes, electronic compasses, accelerometers, or global positioning system (GPS) modules.

18. The method of claim 1, wherein the directional image sensor data is captured with different exposure values—EV—and interleaved for capturing both bright and dark image portions, thereby identifying directions and positions of light sources.

19. The method of claim 18, wherein the directional image sensor data is captured every even times with a first EV suitable for capturing bright image portions, and wherein the directional image sensor data is captured every odd times with a second EV suitable for capturing dark image portions.

20. The method of claim 1, wherein the light source image is generated in an image rendering environment, and further comprising:

determining, based at least in part on the light source image, first ambient light conditions on an image rendering surface and second ambient light conditions on a surface other than the image rendering surface;

determining that the second ambient light conditions on the surface are better than the first ambient light conditions on the image rendering surface;

automatically repositioning a display screen of an image rendering device to the surface with the second ambient light conditions;

rendering one or more images on the display screen of the image rendering device at the surface with the second ambient light conditions.

* * * * *